US010339382B2

(12) United States Patent
Solomin et al.

(10) Patent No.: US 10,339,382 B2
(45) Date of Patent: Jul. 2, 2019

(54) FEEDBACK BASED REMOTE MAINTENANCE OPERATIONS

(71) Applicant: FIELDBIT LTD., Kfar-Saba OT (IL)

(72) Inventors: Shay Solomin, Kfar-Saba (IL); Evyatar Meiron, Kfar-Saba (IL); Alex Rapoport, Tel Aviv (IL)

(73) Assignee: FIELDBIT LTD., Kfar-Saba (IL)

( * ) Notice: Subject to any disclaimer, the term of this patent is extended or adjusted under 35 U.S.C. 154(b) by 8 days.

(21) Appl. No.: 14/852,567

(22) Filed: Sep. 13, 2015

(65) Prior Publication Data

US 2016/0350595 A1  Dec. 1, 2016

Related U.S. Application Data

(63) Continuation-in-part of application No. 14/816,012, filed on Aug. 2, 2015, which is a continuation-in-part of application No. 14/726,542, filed on May 31, 2015.

(51) Int. Cl.
| | |
|---|---|
| *G06K 9/00* | (2006.01) |
| *G02B 27/01* | (2006.01) |
| *G06T 19/00* | (2011.01) |
| *G06K 9/62* | (2006.01) |

(52) U.S. Cl.
CPC ....... *G06K 9/00671* (2013.01); *G02B 27/017* (2013.01); *G06K 9/6263* (2013.01); *G06T 19/006* (2013.01); *G02B 2027/014* (2013.01); *G02B 2027/0138* (2013.01); *G02B 2027/0178* (2013.01)

(58) Field of Classification Search
CPC .............. G02B 27/017; G02B 27/0172; G02B 27/0176; G02B 2027/0174; G02B 2027/0178
See application file for complete search history.

(56) References Cited

U.S. PATENT DOCUMENTS

| | | | |
|---|---|---|---|
| 8,914,472 B1 * | 12/2014 | Lee ................... | H04L 29/06476 709/205 |
| 9,575,563 B1 * | 2/2017 | Li ........................... | G06F 3/017 |
| 2002/0049510 A1 * | 4/2002 | Oda ....................... | B25J 9/1689 700/114 |

(Continued)

*Primary Examiner* — Dong Hui Liang
(74) *Attorney, Agent, or Firm* — Reuven K. Mouallem; FlashPoint IP Ltd.

(57) ABSTRACT

A method for feedback based maintenance wherein the method may include transmitting to an intermediate computerized system a first image that was acquired, at an acquisition point of time, by a head mounted display (HMD) mounted on a head of a first user; transmitting the first image from the intermediate computerized system and towards a computerized device of a second user; displaying on the computerized device of the second user the first image; receiving feedback, in response to the displaying and by the intermediate computerized system; generating, by the intermediate computerized system, an augmented image that comprises the first image and the feedback; transmitting to the HMD the augmented image; adjusting, by the HMD the augmented image to provide an amended augmented image that corresponds to visual information as viewed by the HMD at a display point in time; and displaying, by the HMD, the amended augmented image.

20 Claims, 46 Drawing Sheets

(56) References Cited

U.S. PATENT DOCUMENTS

| | | | | |
|---|---|---|---|---|
| 2005/0108427 A1* | 5/2005 | Datta | H04L 29/06 | 709/238 |
| 2006/0031087 A1* | 2/2006 | Fox | G06Q 30/02 | 705/319 |
| 2006/0262759 A1* | 11/2006 | Bahl | H04W 72/0406 | 370/338 |
| 2006/0294455 A1* | 12/2006 | Morris | G06F 17/241 | 715/209 |
| 2010/0259619 A1* | 10/2010 | Nicholson | H04N 5/2251 | 348/158 |
| 2011/0069032 A1* | 3/2011 | Chou | G06F 3/038 | 345/173 |
| 2011/0128364 A1* | 6/2011 | Ono | G02B 27/017 | 348/78 |
| 2013/0083063 A1* | 4/2013 | Geisner | G06T 19/006 | 345/633 |
| 2013/0113973 A1* | 5/2013 | Miao | G09G 3/003 | 348/333.01 |
| 2013/0135295 A1* | 5/2013 | Li | G06T 19/006 | 345/419 |
| 2013/0137076 A1* | 5/2013 | Perez | G09B 5/06 | 434/308 |
| 2013/0174205 A1* | 7/2013 | Jacobsen | H04N 21/43637 | 725/81 |
| 2013/0246967 A1* | 9/2013 | Wheeler | G06F 3/012 | 715/784 |
| 2015/0062163 A1* | 3/2015 | Lee | G09G 3/003 | 345/633 |
| 2016/0080732 A1* | 3/2016 | Pedley | H04N 13/0425 | 345/8 |
| 2016/0269631 A1* | 9/2016 | Jiang | H04N 5/23238 | |

* cited by examiner

| Element | Description |
|---|---|
| | Select to add text to image |
| | Select to draw a rectangular marker to image |
| | Select to draw any shape with your finger (freestyle draw) |
| | Select to draw a circular marker |
| | Select to draw an arrow pointer |
| | Select to change the color of the current annotation |
| | Select to add a new photo |
| | Select to send the image. This adds the annotated picture to the current ticket session so that others can see it |

| Element | Description |
|---|---|
| ... | Select to display the following available options:<br><br>Edit description – to change the description text that appears next to the annotated image when looking at the target object with the smartglasses.<br><br>Replace image – to change the image (keeps the annotations that you already made) |

FIG.22

| Element | Description |
|---|---|
| ⊙ | Pointer – Use to select an object or option in the GUI. When the pointer is placed over an option button, the button changes colors for a few seconds and then the option is activated. |
| ◯ | Camera – Select to take a photo. For more information, refer to |
| ⊞ | Show/Hide UI Select to hide the various control objects from the screen. After you lock the UI, only the pointer and the locked icon remain. To show the other controls, select it again. |
| ⊙ | Change View Mode Select to change the current view mode of the smartglasses. When selected, the three available options are displayed below: |
| ◯ | Optical See-through mode Select this mode to display the AR annotations over the target object in your field of view. |
| △ | Camera See-through mode Select this mode to display the AR annotations over the target object as part of the live camera feed. |
| A | Fixed Display mode Select this mode to display the images with the AR annotations in a fixed position in your field of view. |
|  | Live Video Feed Connected This indicator shows if the expert is currently remotely connected and watching the live video camera feed from your smartglasses. The following color conditions exist: Empty (no color) – Expert is blocked from connecting to the video feed. Gray – Expert is not connected to video feed. Green – Expert is connected to the live video feed and currently watching the live video. Orange – Expert is connected to the live video feed but not currently watching. This can mean that the expert is currently annotating a screen shot or answering a phone call. |

FIG. 31

| Element | Description |
|---|---|
| | Calibrate Picture<br>Used to calibrate a new annotated picture before it can be viewed. This option is needed only for view the annotations only in optical see-through mode. For more information, refer to New picture calibration. |
| | Quick Reply<br>Select to open a menu of icons that you can use to send a quick reply to the supporter without having to type.<br>The following icons are available: |
| | Settings<br>Select to open a range of options described below. |
| | The menu icons below appear after selecting the Setting icon<br>Information<br>Displays the following information:<br>User name – logged in user of the smartglasses<br>Application version – version number of the Fieldbit Coach smartglasses application installed<br>Glasses ID number<br>Licensing info |
| | Send log file<br>Select to send log files from the smartglasses directly to Fieldbit for troubleshooting.<br>Use this option if you have experienced technical problems with the smartglasses application. |
| | Block/Allow Live Video<br>Select to block the live video feed from your glasses camera to the remote supporter whenever this is required for security or privacy issues. Select again to allow video feed. For information on the Live Video feature, see Live Video. |
| | Logout<br>Select to log out of the Fieldbit Coach smartglasses application. |
| | Smartglasses Calibration<br>Select to perform the initial smartglasses calibration. Use if you did not yet perform the calibration or if you need to calibrate again. For information on this procedure, see Performing initial smartglasses calibration. |

FIG.32

| Tool | Description |
|---|---|
| | Information<br>Displays the following information:<br>- User name — logged in user of the smartglasses<br>- Application version — version number of the Fieldbit Coach smartglasses application installed<br>- Glasses ID number<br>- Licensing info |
| | Send logs<br>Sends log files from the smartglasses directly to Fieldbit for troubleshooting. Use this option if you have experienced technical problems with the smartglasses application. |
| | Block/Allow Live Video<br>Blocks the live video feed from your glasses camera to the remote supporter whenever this is required for security or privacy issues. Select again to allow video feed. For information on the Live Video feature, see Live Video. |
| | Logout<br>Logs you out of the Fieldbit Coach smartglasses application. |
| | Smartglasses Calibration<br>Performs initial smartglasses calibration. Use if you have not yet performed the calibration or if you need to recalibrate. For more information, see initial smartglasses calibration. |
| | Connect to WiFi<br>Use this option when you wish to replace the current network or when your connection was lost. |

FEEDBACK BASED REMOTE MAINTENANCE OPERATIONS

RELATED APPLICATIONS

This application is a continuation in part of U.S. patent application Ser. No. 14/816,012 filing date Aug. 2 2015 which in turn is a continuation in part of U.S. patent application Ser. No. 14/726,542 filing date May 31 2015, which is incorporated herein by reference.

BACKGROUND

Field technicians may be required to perform maintenance operations on systems that grow more and more complex and include an increasing number of components.

There is a growing need to provide a simple and cost effective solution for assisting field technicians.

SUMMARY

There are provided systems, methods and non-transitory computer readable media, as illustrated in the claims.

According to an embodiment of the invention there may be provided a method for feedback based maintenance, the method may include transmitting to an intermediate computerized system a first image that was acquired, at an acquisition point of time, by a head mounted display (HMD) mounted on a head of a first user; transmitting the first image from the intermediate computerized system and towards a computerized device of a second user; displaying on the computerized device of the second user the first image; receiving feedback, in response to the displaying, by the computerized system; generating, by at least one of the computerized device of the second user and the intermediate computerized system, an augmented image that comprises the first image and the feedback; transmitting to the HMD the augmented image; adjusting, by the HMD the augmented image to provide an amended augmented image that corresponds to visual information as viewed by the HMD at a display point in time; and displaying, by the HMD, the amended augmented image.

The method may include receiving by the intermediate computerized system a feedback request from the first user to provide feedback related to first image and transmitting the feedback request to the computerized device of the second user.

According to an embodiment of the invention there may be provide a non-transitory computer readable medium that once executed by a computer causes the computer to execute the steps of transmitting to an intermediate computerized system a first image that was acquired, at an acquisition point of time, by a head mounted display (HMD) mounted on a head of a first user; transmitting the first image from the intermediate computerized system and towards a computerized device of a second user; displaying on the computerized device of the second user the first image; receiving feedback, in response to the displaying and by the intermediate computerized system; generating, by at least one of the computerized device of the second user and the intermediate computerized system, an augmented image that may include the first image and the feedback; transmitting to the HMD the augmented image; adjusting, by the HMD the augmented image to provide an amended augmented image that corresponds to visual information as viewed by the HMD at a display point in time; and displaying, by the HMD, the amended augmented image.

According to an embodiment of the invention there may be provided a system that may include a HMD, an intermediate computerized system, a computerized device of a second user; whereon the system is configured to execute the steps of: transmitting to the intermediate computerized system a first image that was acquired, at an acquisition point of time, by the HMD when mounted on a head of a first user; transmitting the first image from the intermediate computerized system and towards the computerized device of a second user; displaying on the computerized device of the second user the first image; receiving feedback, in response to the displaying and by the intermediate computerized system; generating, by at least one of the computerized device of the second user and the intermediate computerized system, an augmented image that may include the first image and the feedback; transmitting to the HMD the augmented image; adjusting, by the HMD the augmented image to provide an amended augmented image that corresponds to visual information as viewed by the HMD at a display point in time; and displaying, by the HMD, the amended augmented image.

The method may include receiving, by the intermediate computerized system, the feedback at an absence of a feedback request from the first user to provide feedback related to first image.

The receiving of the feedback may include receiving the feedback from the second user.

The receiving of the feedback may be preceded by relaying the first image from the computerized device of the second user to a computerized device of a third user; and receiving the feedback from the third user.

The transmitting of the first image may include transmitting to the intermediate computerized system a video stream that may include the first image.

The intermediate computerized system may be a cloud environment server.

The method may include broadcasting the first image to multiple computerized devices of multiple users.

The method may include receiving feedback only from a single user of the multiple users.

The method may include receiving feedback only from at least two users of the multiple users.

The HMD may be a see-through binocular head mounted display.

The adjusting, by the STBHMD the augmented image to provide an amended augmented image may be preceded by performing a calibration process based upon a certain image of an object and feedback from the first user.

According to an embodiment of the invention there may be provided a method for feedback based maintenance. The method may include transmitting to an intermediate computerized system a first image that was acquired, at an acquisition point of time, by first user device that differs from a head mounted display (HMD) mounted on a head of the first user; transmitting the first image from the intermediate computerized system and towards a computerized device of a second user; displaying on the computerized device of the second user the first image; receiving feedback, in response to the displaying and by the intermediate computerized system; generating, by at least one of the computerized device of the second user and the intermediate computerized system, an augmented image that may include the first image and the feedback; transmitting to the HMD the augmented image; adjusting, by the HMD the augmented image to provide an amended augmented image that corresponds to visual information as viewed by the HMD at a display point in time; and displaying, by the HMD, the amended augmented image.

According to an embodiment of the invention there may be provide a non-transitory computer readable medium that once executed by a computer causes the computer to execute the steps of transmitting to an intermediate computerized system a first image that was acquired, at an acquisition point of time, by first user device that differs from a head mounted display (HMD) mounted on a head of the first user; transmitting the first image from the intermediate computerized system and towards a computerized device of a second user; displaying on the computerized device of the second user the first image; receiving feedback, in response to the displaying and by the intermediate computerized system; generating, by at least one of the computerized device of the second user and the intermediate computerized system, an augmented image that may include the first image and the feedback; transmitting to the HMD the augmented image; adjusting, by the HMD the augmented image to provide an amended augmented image that corresponds to visual information as viewed by the HMD at a display point in time; and displaying, by the HMD, the amended augmented image.

According to an embodiment of the invention there may be provided a system that may include a HMD, an intermediate computerized system, a computerized device of a second user; whereon the system is configured to execute the steps of: transmitting to an intermediate computerized system a first image that was acquired, at an acquisition point of time, by first user device that differs from a head mounted display (HMD) mounted on a head of the first user; transmitting the first image from the intermediate computerized system and towards a computerized device of a second user; displaying on the computerized device of the second user the first image; receiving feedback, in response to the displaying and by the intermediate computerized system; generating, by at least one of the computerized device of the second user and the intermediate computerized system, an augmented image that may include the first image and the feedback; transmitting to the HMD the augmented image; adjusting, by the HMD the augmented image to provide an amended augmented image that corresponds to visual information as viewed by the HMD at a display point in time; and displaying, by the HMD, the amended augmented image.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 22 and 31-34 illustrate various icons according to various embodiment of the invention;

DETAILED DESCRIPTION OF THE DRAWINGS

Figure 1:
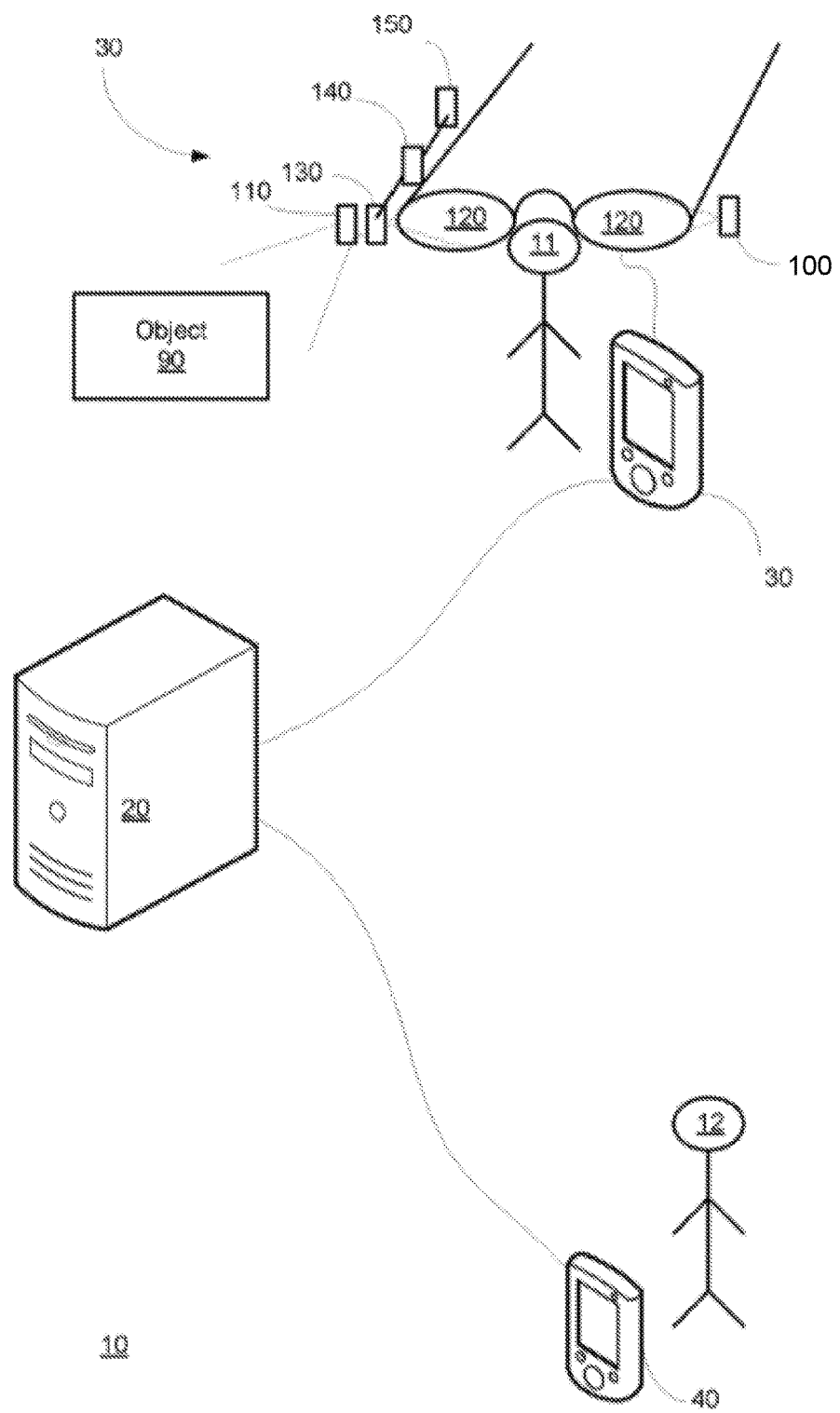
FIG. 1 illustrates a system according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

FIG. 1 illustrates a system 10 according to an embodiment of the invention.

System 10 includes first device 30 of a first person 11, second device 40 of a second person 12, a see-through binocular head mounted display (STBHMD) device worn by the first person, and a remote computer such as a cloud server 20. FIG. 1 is out of scale.

STBHMD device 100 may be shaped as a wearable glass.

Cloud server 20, first device 30, second device 40 and STBHMD device 100 may be coupled to each other over one or more networks.

Cloud server 20 can store at least part of the traffic exchanged between the first and second devices, relay the traffic between the first and second devices, and the like.

First device 30 and second device 40 may be mobile phones, personal data assistants, tablets or any other computerized system.

The first person may be a remote technician. The first person may request to receive guidance from the second person relating to a maintenance operation related to an object or any other operation related to the object.

The first device 30 may send, to the second device 40, a first image of the object. The first image may be acquired by STBHMD device 100 or by first device 30.

The second person may create digital content (referred to as input digital content) that may refer to a certain element of the object. The digital content may be fed to the second device 40 using any known method.

The input digital content may be one or more symbols, text and the like. For example—the input digital content may include a circle that surround the certain element of the object, an arrow pointing to the certain element of the object, and the like.

Second device 40 may overlay the input digital content onto an image of the object to provide an input augmented image of the object.

STBHMD device 100 may perform, with an assistance of the first person, a calibration process in order to determine the spatial relationship between STBHMD device 100 at a certain moment. The calibration process is significant because the optical axis of a camera of STBHMD device 100 is not aligned with the line of sight of the first person. It is noted that the calibration process may be skipped under certain circumstances. For example—when the dimensions of the object and/or one or more object elements are known and can be used for determining the spatial relationship to STBHMD device 100.

STBHMD device 100 may use the outcome of the calibration process in order to generate an output augmented image of the object in which an output digital content is properly overlaid on the certain element of the object—as viewed by the first person.

The calibration process may include multiple calibration iterations.

Figure 2:
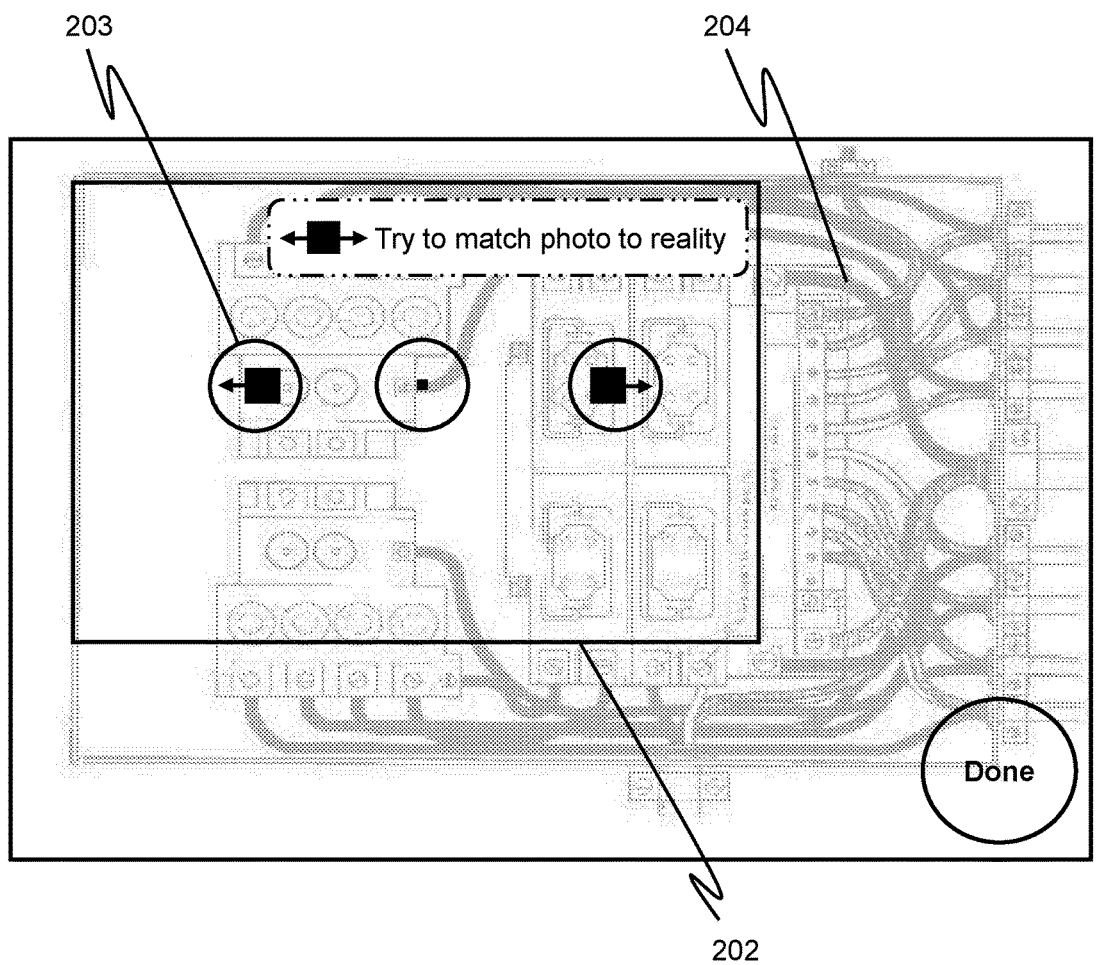
FIG. 2 an partially transparent representation of an image of an object that is overlaid over an image of the object as seen through a display of a see-through binocular head mounted display (STBHMD) device according to an embodiment of the invention.

During each calibration iteration, STBHMD device 100 displays a partially transparent representation of a first image of the object (hereinafter "partially transparent representation") so that the first person sees the object itself and the partially transparent representation of the first image of the object—see for example FIG. 2 that illustrates a partially transparent representation 202 overlaid over object 204 as seen by the first person.

STBHMD device 100 then receives feedback from the first person relating to the alignment or misalignment between the object itself and the partially transparent representation.

STBHMD device 100 may, for example, display one or more control symbols (for example—a move right symbol, a move left symbol, a move up symbol, a move down symbol, an increase scale symbol, a decrease scale symbol, a calibration completion symbol, or any other control symbols) and allow the first person to elect one of these symbols by performing one or more head movements and/or one or more gestures for selecting one of the symbols. FIG. 2 illustrates an example of control symbol 203.

A symbol may be selected, for example by looking (by the first person) at the same direction for over a predefined period (for example—more than one second).

STBHMD device 100 may then determine whether the calibration process succeeded or whether to perform another calibration iteration. When determining to perform another calibration iteration then STBHMD device 100 changes at least one parameter of the partially transparent representation of the first image to provide a next partially transparent representation of the first image to be used during the next calibration iteration.

The feedback can include at least one out of a vocal instruction, a head movement, any movement within the field of view of STBHMD device 100, a contact between the first person and STBHMD device 100 (pressing a control button), and the like.

Once the calibration process ends, STBHMD device 100 may determine the spatial relationship between STBHMD device 100 and the object.

The spatial relationship may be fed to a tracking module of STBHMD device 100 that tracks the movements of STBHMD device 100 in order to properly overlay the output digital content on any image of the object.

FIG. 1 illustrates STBHMD device 100 as including camera 110, display 120, projector 130, processor 140 and a sensor 150.

Camera 110 may acquire images. Display 120 is a see-through display. Projector 130 may project digital content onto display 120. Processor 140 may determine the manner in which the digital content is projected on display 120. Processor 140 may perform motion tracking.

Sensor 150 may be an accelerometer, a gyroscope or any other sensor that may sense movements of the head of the first person. Sensor 150 may be a voice sensor capable of detecting (with or without the help of processor 140) voice commands. Alternatively, sensor 150 may be the camera 110 wherein processor 140 may detect head movements and/or gestures made within the field of view of camera 110.

Figure 3:
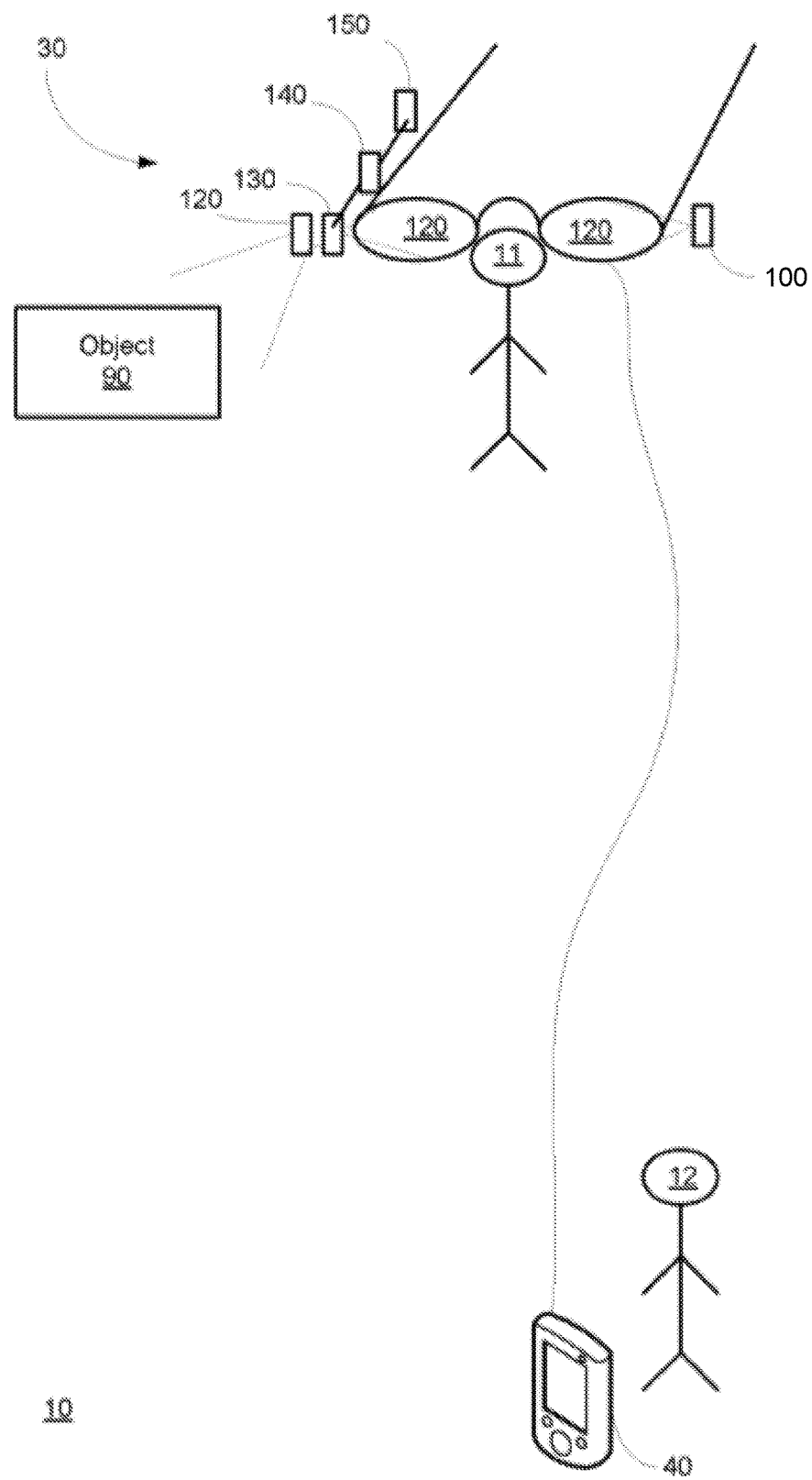
FIG. 3 illustrates a system according to an embodiment of the invention.

FIG. 3 illustrates a system 10 according to an embodiment of the invention.

System 10 includes second device 40, STBHMD device 100 and one or more networks (not shown).

In system 10 of FIG. 3 STBHMD device 100 communicates with second device 40 without the assistance of a cloud server.

Figure 4:
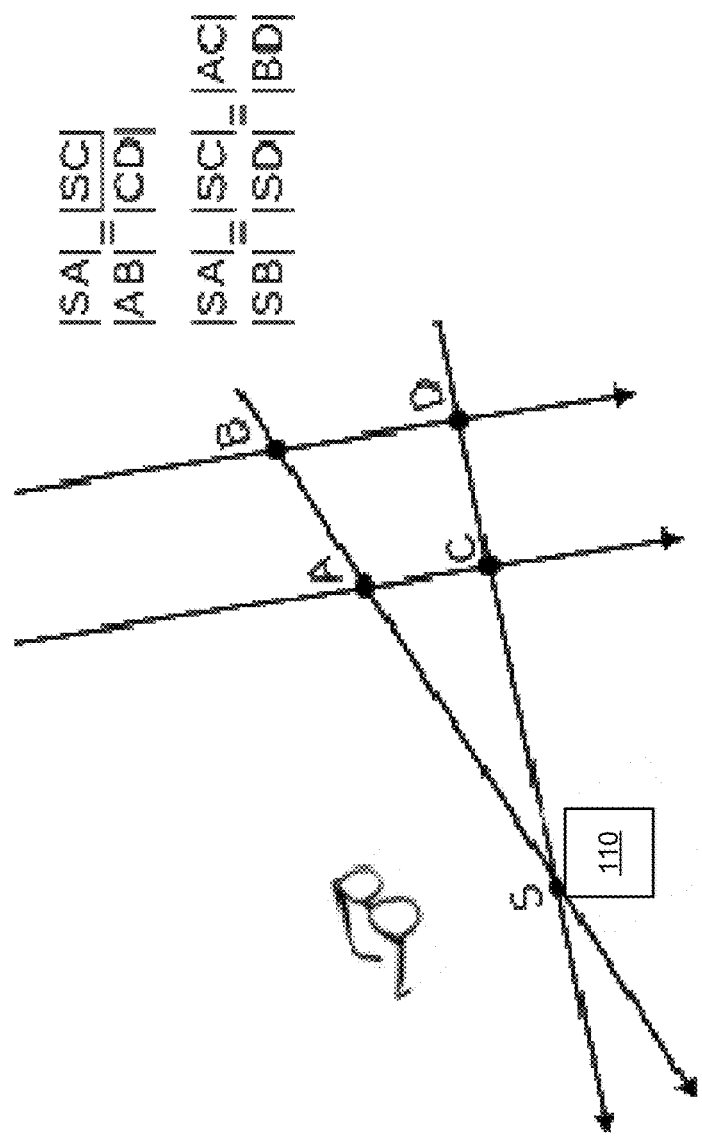
FIG. 4 illustrates various aspects of a calibration process.

FIG. 4 illustrates various aspects of a calibration process.

The calibration process assists in achieving spatial relationship information that may allow accurate augmentation of digital information over an image located at unknown distance or having unknown dimensions.

The calibration process may be based upon the intercept theory. in elementary geometry about the ratios of various line segments that are created if two intersecting lines are intercepted by a pair of parallels, as can be seen in the FIG. 3.

FIG. 4 illustrates a location (represented by point S) of STBHMD device 100, a location of an object (represented by points S and D) and an initial estimated location of the object (represented by points A and C).

According to the theorem, there is a fixed ratio between the distance from STBHMD device 100 (SC or SD) to the target width (AC or BD).

When the first person looks at the object, and the object is identified by STBHMD device 100, an partially transparent representation of a first image of the object is displayed to the user so the user can see both the real object and the partially transparent representation.

Because the initial estimated location of the object is erroneous the partially transparent representation and the object (as seen by the first person) are misaligned.

STBHMD device 100 performs, using feedback from the first person, a calibration process and once the user approves that an alignment is obtained—STBHMD device 100 may assume that the distance between STBHMD device 100 and the object is known. The distance may be a length of an imaginary normal from point S to section DB.

According to an embodiment of the invention the calibration process may include setting the partially transparent representation to be of a predefined size (scale) and the user may change the size (scale). The scale may be changes by a scaling factor.

For example, STBHMD device 100 may scale the partially transparent representation of the first image to a fixed size (keep ratio), e.g. 640*480 pixels, assuming that each pixel represents a 1 mm square area. It is noted that the number of pixels may differ from 640*480 pixels.

STBHMD device 100 uses a metric of 1 px in the image is equal to 1 mm in reality. It is noted that the metric may differ from one pixel per millimeter.

STBHMD device 100 may start the calibration process using a predefined scale factor FACTOR (which sets the sensitivity/accuracy level of the alignment).

STBHMD device 100 then starts the multiple calibration iterations during which the feedback from the first person may require the partial transparent representation to move and/or to change its scale (thereby increasing or decreasing its size).

There is provides an example of a pseudo-code:

```
WIDTH_MM = 640
HEIGHT_MM = 480
FACTOR = 0.1
MAX = 10 #6.4 Meter
MIN = 0.1 #6.4 cm
K = 1
Annotation_init(IMAGE,K)
Start_track(IMAGE, WIDTH_MM, HEIGHT_MM)
while (TRUE)
  if (scaling_input_arrived)
    if (scale_up and K < MAX) // received from user head movement
      K = K + FACTOR
    else if (scale_down and K > MIN) //scale_down
      K = K - FACTOR
    restart_tracking(IMAGE, WIDTH_MM*K, HEIGHT_MM*K)
    Annotation_Rescale(K)
```

Figure 5:
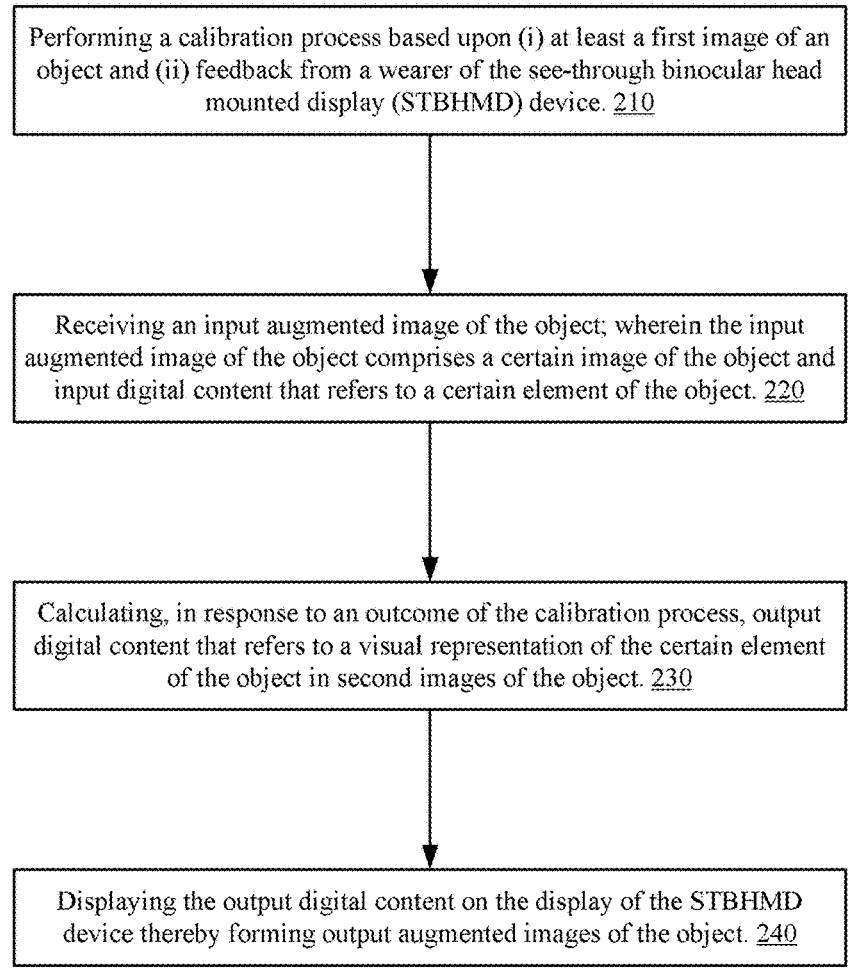
FIG. 5 illustrates a method according to an embodiment of the invention.

FIG. 5 illustrates method 200 for providing augmented reality, according to an embodiment of the invention.

Method 200 may start by stage 210 of performing a calibration process based upon (i) at least a first image of an object and (ii) feedback from a wearer of the see-through binocular head mounted display (STBHMD) device.

The first image of the object may be acquired by the STBHMD device or by another device—such as first device 30 of FIG. 1.

Stage 210 may include performing multiple calibration iterations.

Each calibration iteration may include (i) displaying, on a display of the STBHMD device, and at different point in time of the calibration process, partially transparent representations of the first image of the object, (ii) receiving the feedback from the wearer of the STBHMD device; (iii) changing, in response to the feedback from the wearer of the STBHMD device, at least one parameter of a current partially transparent representation of the first image of the object to provide a next partially transparent representation of the first image.

The at least one parameter may be a scale of the partially transparent representation of the first image. Method 200 may include changing the resolution of the scale.

Figure 6:
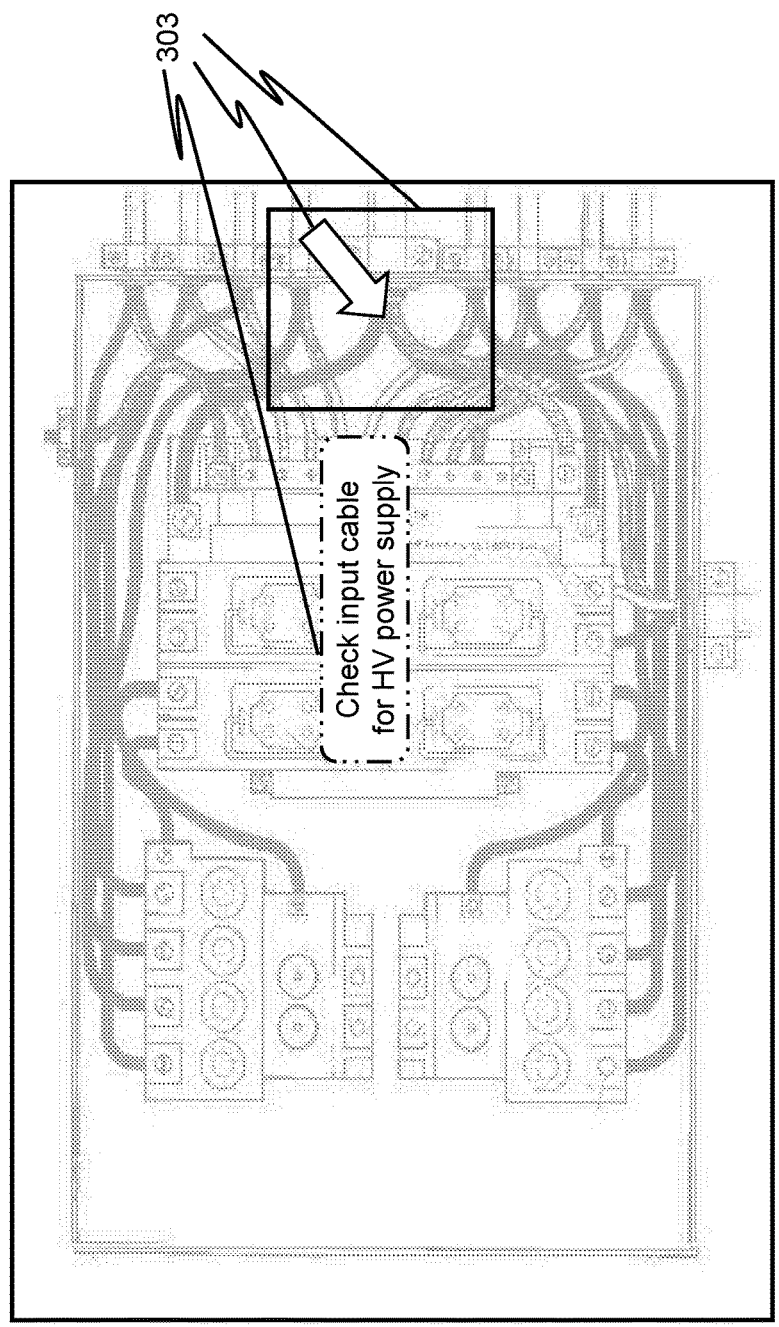
FIG. 6 illustrates an input augmented image according to an embodiment of the invention.

Stage 210 may be followed by stage 220 of receiving an input augmented image of the object; wherein the input augmented image of the object comprises a certain image of the object and input digital content that refers to a certain element of the object. FIG. 6 illustrates an example of an input augmented image 301 that includes input digital content 303.

The certain image of the object may be acquired by the STBHMD device or by another device—such as first device 30 of FIG. 1. The certain image of the object may be acquired during the calibration process or outside the calibration process.

Stage 220 may be followed by stage 230 of calculating, in response to an outcome of the calibration process, output digital content that refers to a visual representation of the certain element of the object in second images of the object.

Figure 7:
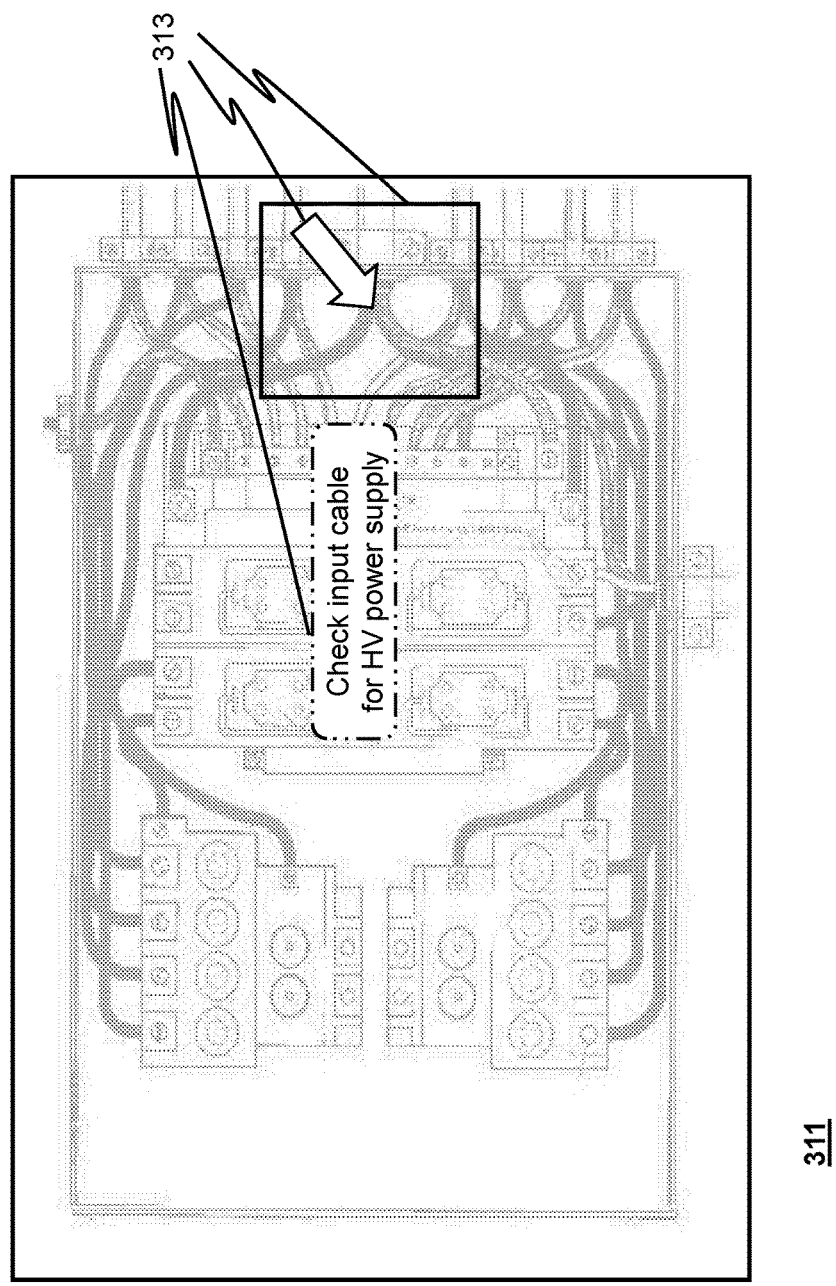
FIG. 7 illustrates an output augmented image according to an embodiment of the invention.

Stage 230 may be followed by stage 240 of displaying the output digital content on the display of the STBHMD device thereby forming output augmented images of the object. FIG. 7 illustrates an example of an output augmented image 311 that includes output digital content 313.

Stage 230 may be responsive to a relationship between the certain image of the object and the second images of the object. For example—a tracking unit may determine changes in the distance between the STBHMD device and the object and/or changes in a direction of image acquisition associated with the certain image of the object and the second images.

According to an embodiment of the invention there is provided a hand-free scheme for controlling a HMD device. The HMD device may be a binocular or monocular see-through binocular HMD device or any other type of HMD.

The HMD device displays to the user a frame of user interface elements. User interface elements may be icons or any other symbol, text, image and the like that can assist the user to control the HMD device.

A user may control the HMD device by selecting a selectable user interface element. A selectable user interface element can be selected by the user by performing a head movement that causes the given user interface element to overlap with the selectable user interface element.

The user can be provided with a large amount of selectable user interface elements that may belong to multiple frames.

The HMD device may display to the user one (or more) frame at a time and the selection between the frames can be responsive to the orientation of the head of the user and to the location of the given user interface element.

The user can orient his head within a three dimensional space.

According to an embodiment of the invention, as long as the user moves his head as an adequate speed (above a first speed threshold and maybe below a second speed threshold) the HMD device may display to the user the frames that are associated with the different orientations of the head.

According to an embodiment of the invention, as long as the user moves his head as an inadequate speed (below the first speed threshold and maybe above the second speed threshold) the HMD device may display to the user the same frame and the entire axes system of the multiple frame tracks the movement of the head.

The overall number of selectable user interface elements and/or the number of selectable user interface elements per frame may be predetermined, set by the user, updated by the user or updated by another entity, and the like.

There is provided a hand free control scheme that is not sound based and thus is immune to ambient sounds and is more robust the sound based control scheme.

FIGS. 9-15 illustrates an example of the execution of method 800 according to an embodiment of the invention.

Figure 9:
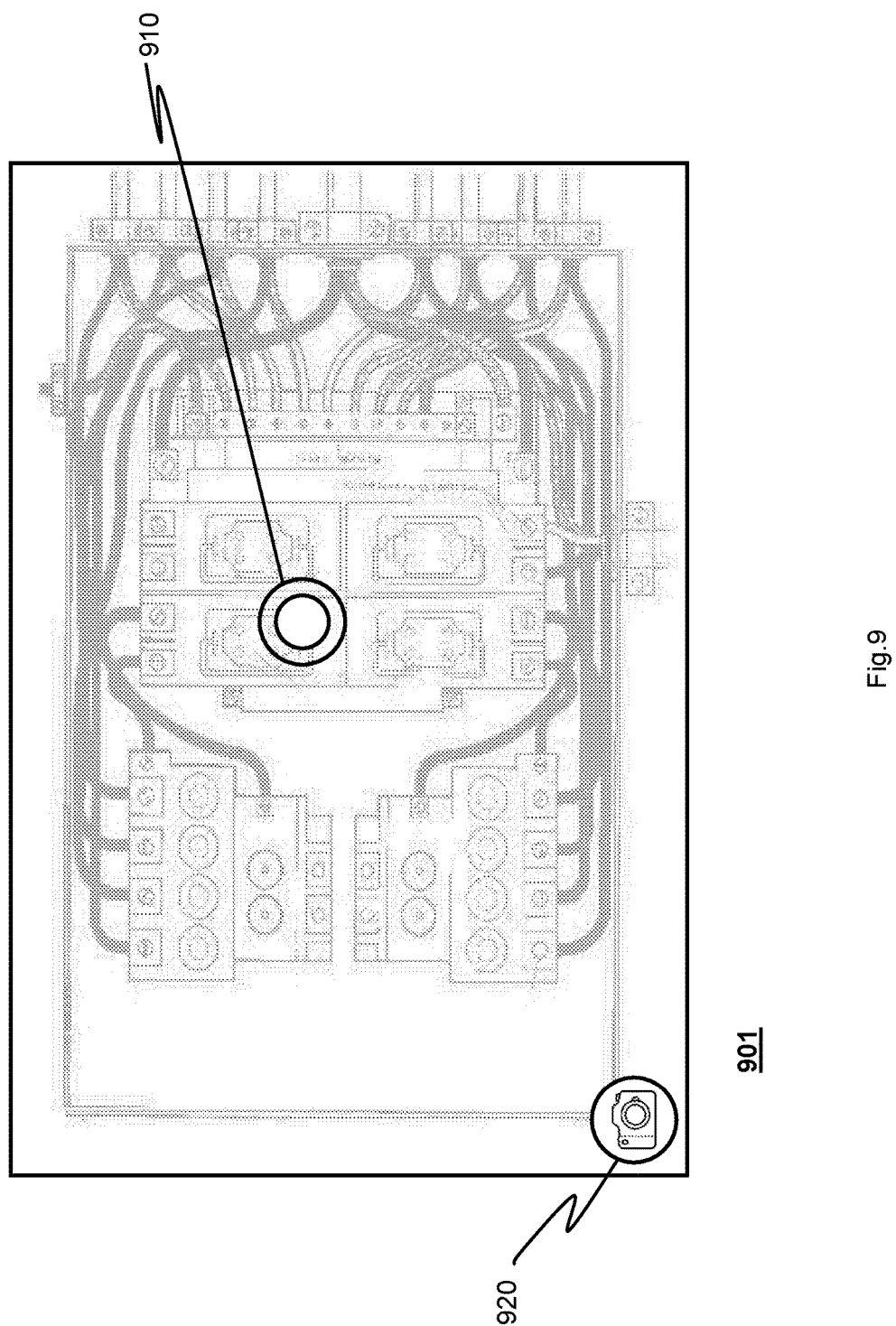
FIGS. 9-12 illustrate screen shots of the display of a STBHMD device according to an embodiment of the invention.
Figure 10:
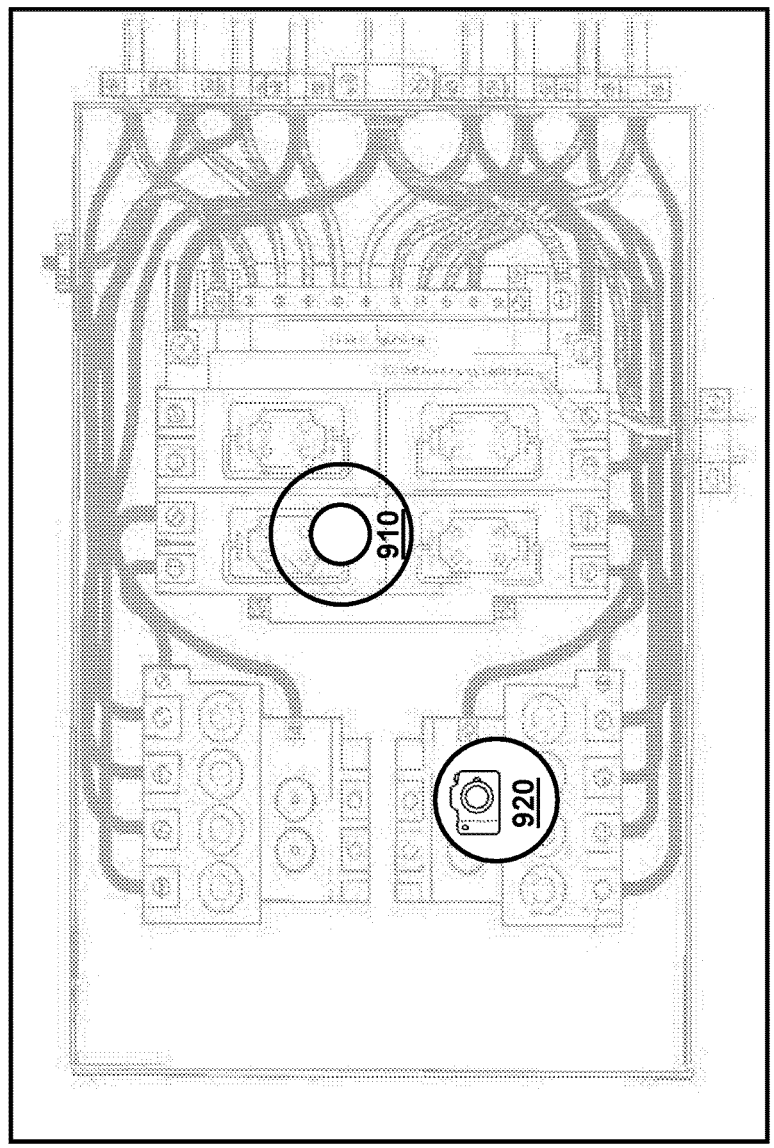
Figure 11:
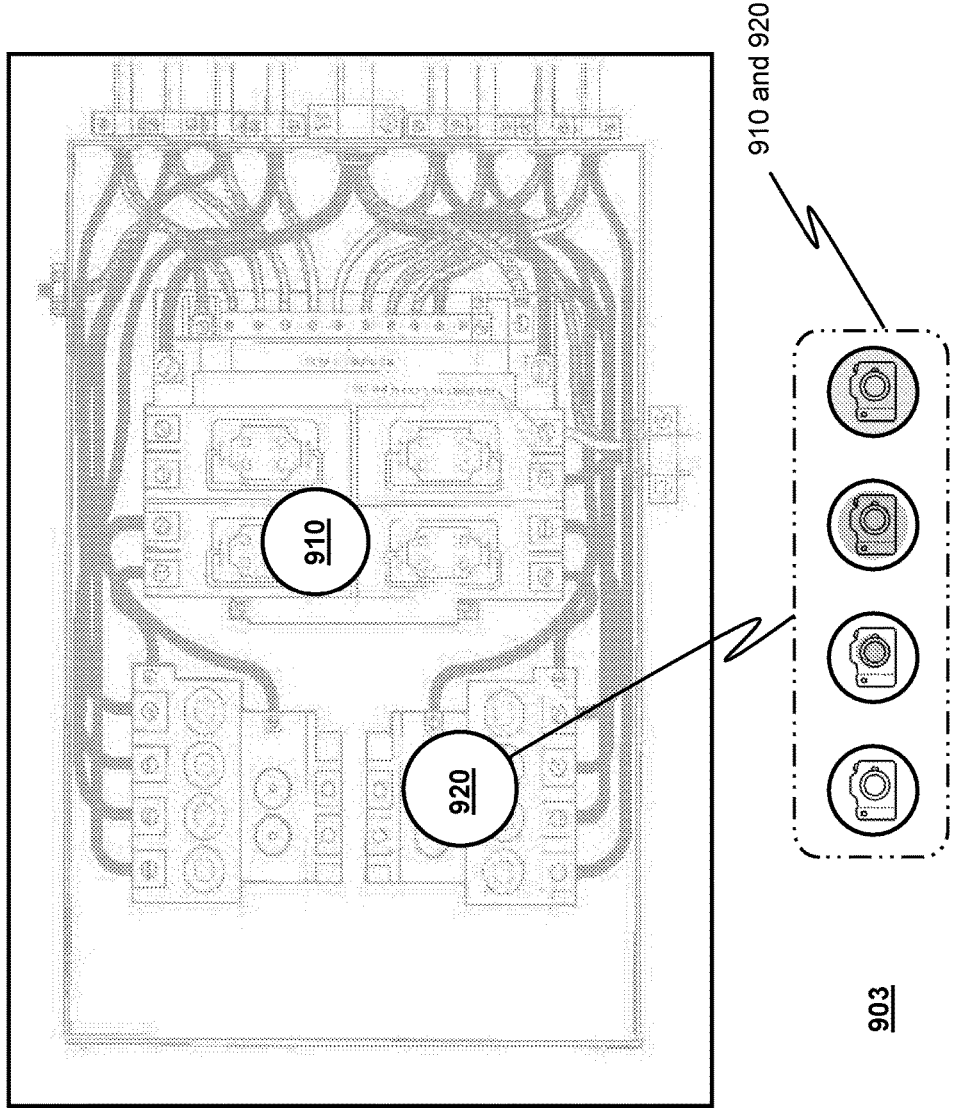
Figure 12:
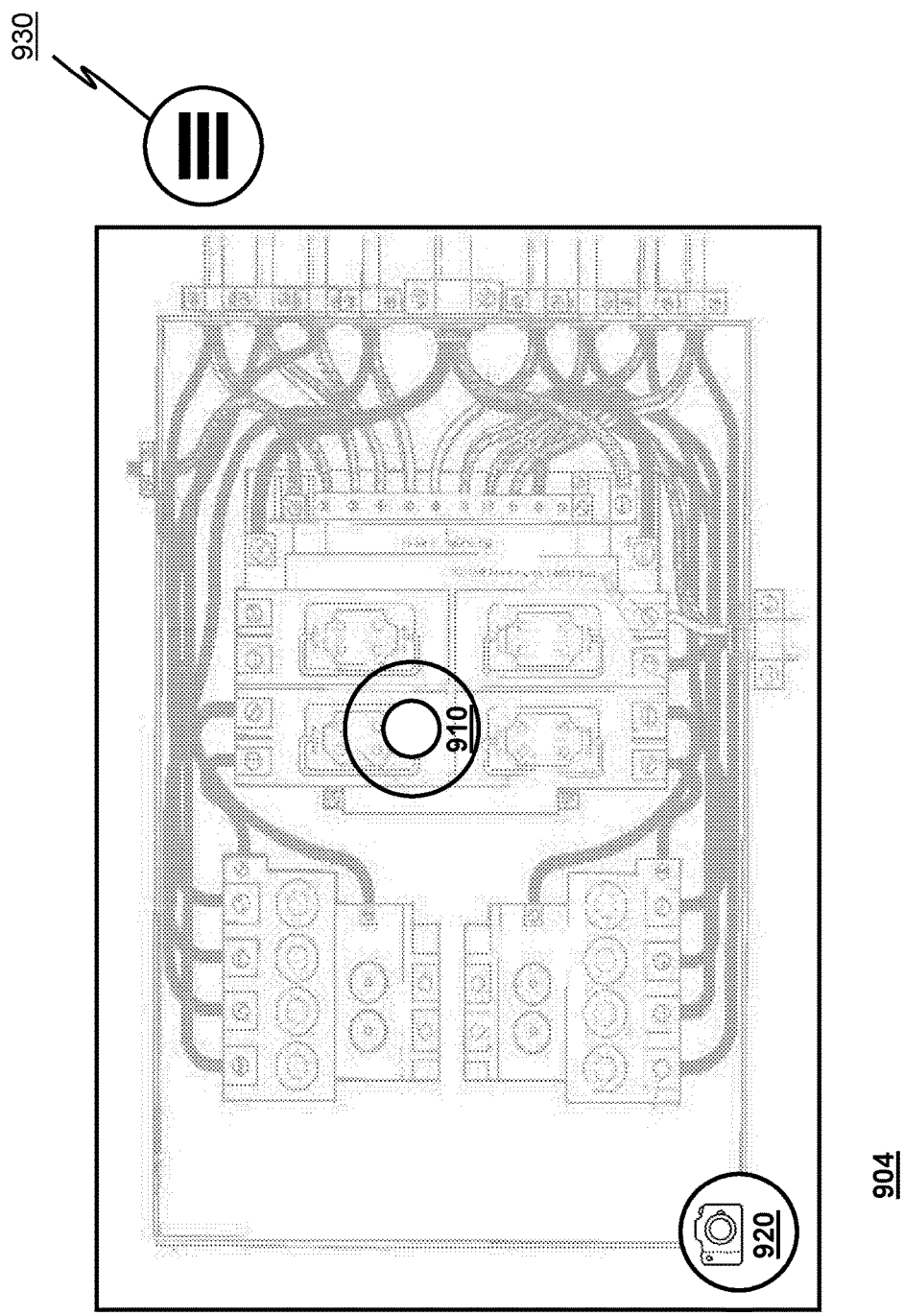

FIGS. 9-11 illustrate screen shots 901, 902 and 903 of the display of a HMD device according to an embodiment of the invention.

The screen shot 901 illustrates a part of a system that may be maintained by the user and a frame of user interface elements that include a given user interface element 910 that is located at the center of the screen and a selectable user interface element 920 that once selected causes the camera of the HMD device to take a picture.

The given user interface element 910 can be maintained at the center of the display (or in any predefined location) regardless of the head movement of the user.

The selectable user interface element 920 can move towards the given user interface element 910 when the user moves his head at a speed that exceeds a first speed threshold. This is shown in screen shots 901, 902 and 903 in which the given user interface element 910 and the selectable user interface element 920 get closer to each other due to the movement of the head of the user (at an adequate speed) towards the selectable user interface element 920.

According to an embodiment of the invention the adequate speed may be delimited by a first speed threshold. The first speed threshold may be, for example, 2.5 degrees per second.

FIG. 11 shows various overlaps between the selectable user interface element 920 and the given user interface element 910.

When the head movement is too slow the HMD device may ignore the movement in the sense that the same user interface elements are shown at the same location on the display of the HMD device.

Accordingly, when the head movement is too slow the entire digital content that is overlaid over the "reality" (the image acquired by the camera of the HMD device or merely through the display itself) may freeze and not more in relation to the field of view of the user.

Since the user moves his head in some direction, he will obviously see something else from the reality, assuming the camera is working or he is in an optical see-through mode.

However, if the current display blocks reality (e.g. full screen image with no transparent parts), he will not see any difference at all.

If the head movement faster than 2.5 degrees per seconds the selectable elements are still static in the view, however the given user interface element 910 will track the head movements, allowing the given user interface element 910 to get closer to the selectable user interface element 920, as illustrated in FIGS. 9-11. according to the movement. See, for example, FIG. 10.

If the given user interface element 910 overlaps with multiple selectable user interface elements then the selectable user interface element 920 with the bigger overlap area is selected.

The selection is not an immediate action. Once there is an interaction, the user needs to keep his head on the target for a predefined overlap period (for example—a second) until the selectable user interface element 920 is really selected.

Since the head is moving all the time, especially when working on some equipment, false alarms (accidentally selecting an item) are very likely, hence this method is mandatory. See, for example, FIG. 11.

According to an embodiment of the invention if the head movement is paused (the user holds still) for predefined reset period (for example 1.2 seconds), the given user interface element and all selectable user interface elements are returned to the original location, as defined by the application, where the given user interface element may be positioned in the center of view. (For instance. The user moved his head as seen in FIG. 10 and then kept his head steady for 1.2 seconds. The application updated the display back the original location as seen in to FIG. 9).

Since the user has freedom to move his head in all direction, the display is not limited to the current view. The display, including all UI elements, can be located anywhere in the space.

In these cases the user needs to move his head in the direction of the hidden UI element, until the element is seen. See, for example, FIG. 12.

Figure 13:
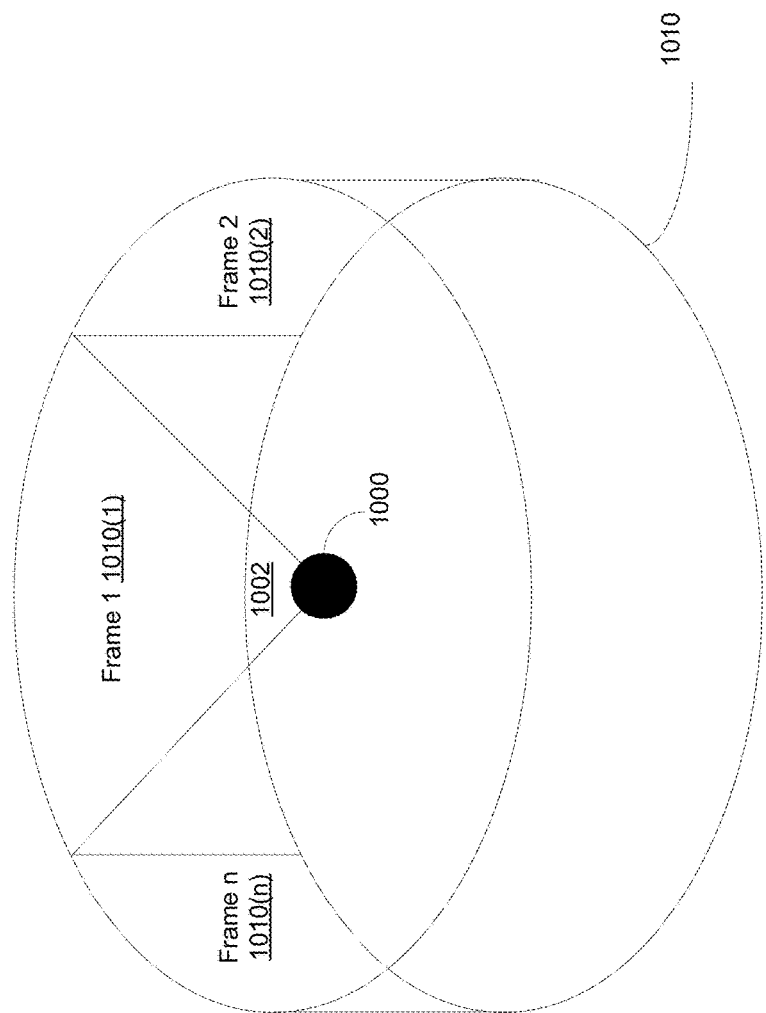
FIGS. 13-15 illustrate a user, a user field of view and a frame of user interface elements displayed to the user according to various embodiments of the invention.
Figure 14:
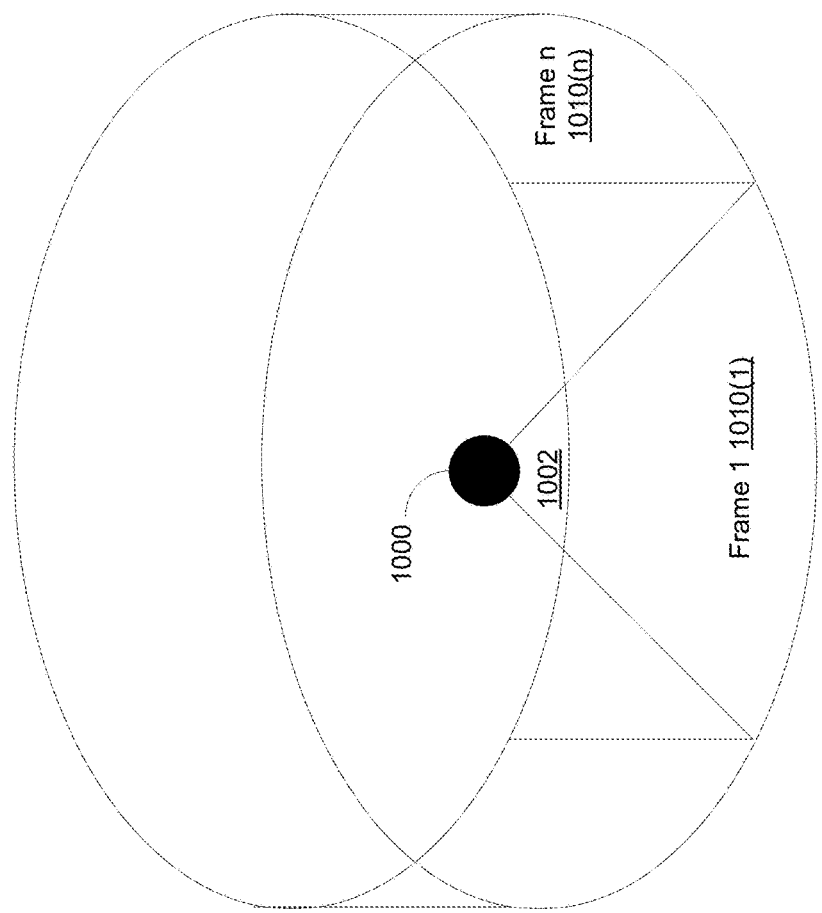
Figure 15:
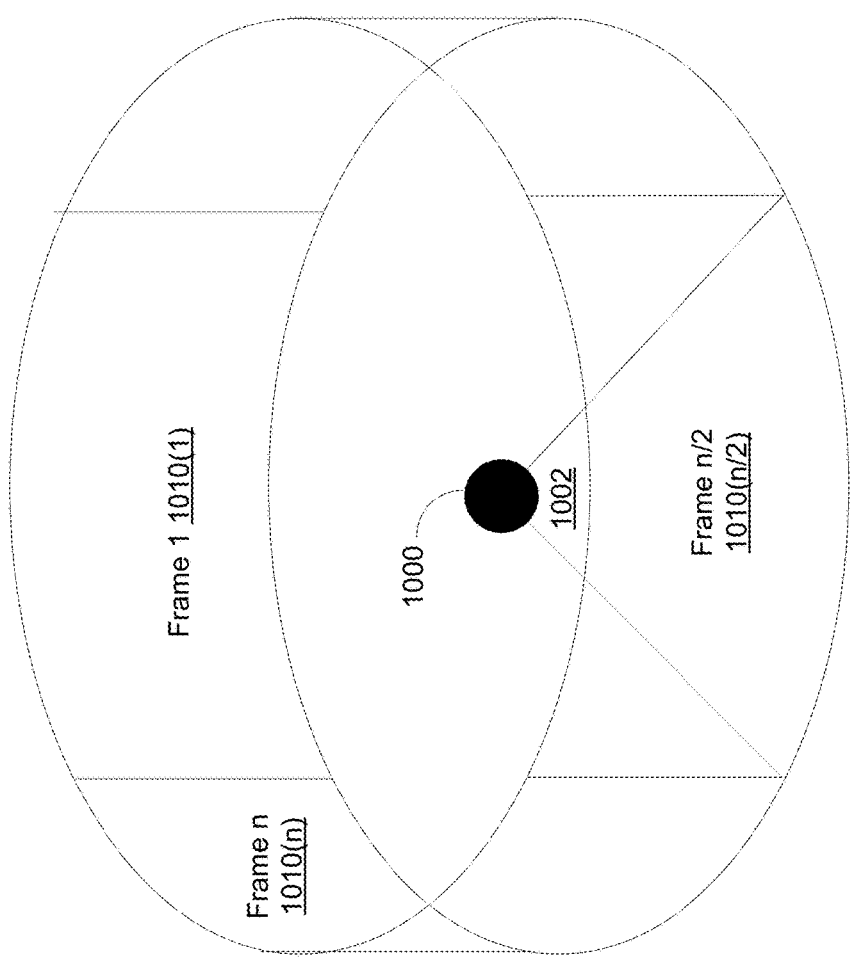

FIGS. 13-15 illustrate a user 1000, a user field of view 1002, and a frame of user interface elements displayed to the user according to various embodiments of the invention.

FIG. 13 illustrates an initial phase in which a user 1000 looks to the north and the HMD device displays to the user a first frame 1010(1), while a second till n'th frame (1010(n)) are outside the field of view 1002 of user 1000.

FIG. 13 illustrates a ring shaped three dimensional space that is segmented to n segments—each segment associated with a different frame of frames 1010(1)-1010(n).

FIG. 14 illustrates a second phase in which user 1000 looks to the south. The user rotated from the initial position by 180 degrees but the head movement was too slow (below the first speed threshold) so that the HMD device continues to display to the user the first frame 1010(1). Thus—the axis system of the three dimensional space had to be rotated by 180 degrees—so that the user will see the same frame (1010(1)) throughout the movement.

FIG. 15 illustrates a second phase in which user 1000 looks to the south. The user rotated from the initial position by 180 degrees but the head movement was fast enough (above the first speed threshold) so that the HMD device display to the (n/2)'th frame 1010(n/2).

Because the head movement was fast enough the axis system of the three dimensional space maintained unchanged and the user was able to scan the first till (n/2)'th frame (assuming a clockwise rotation).

Figure 8:
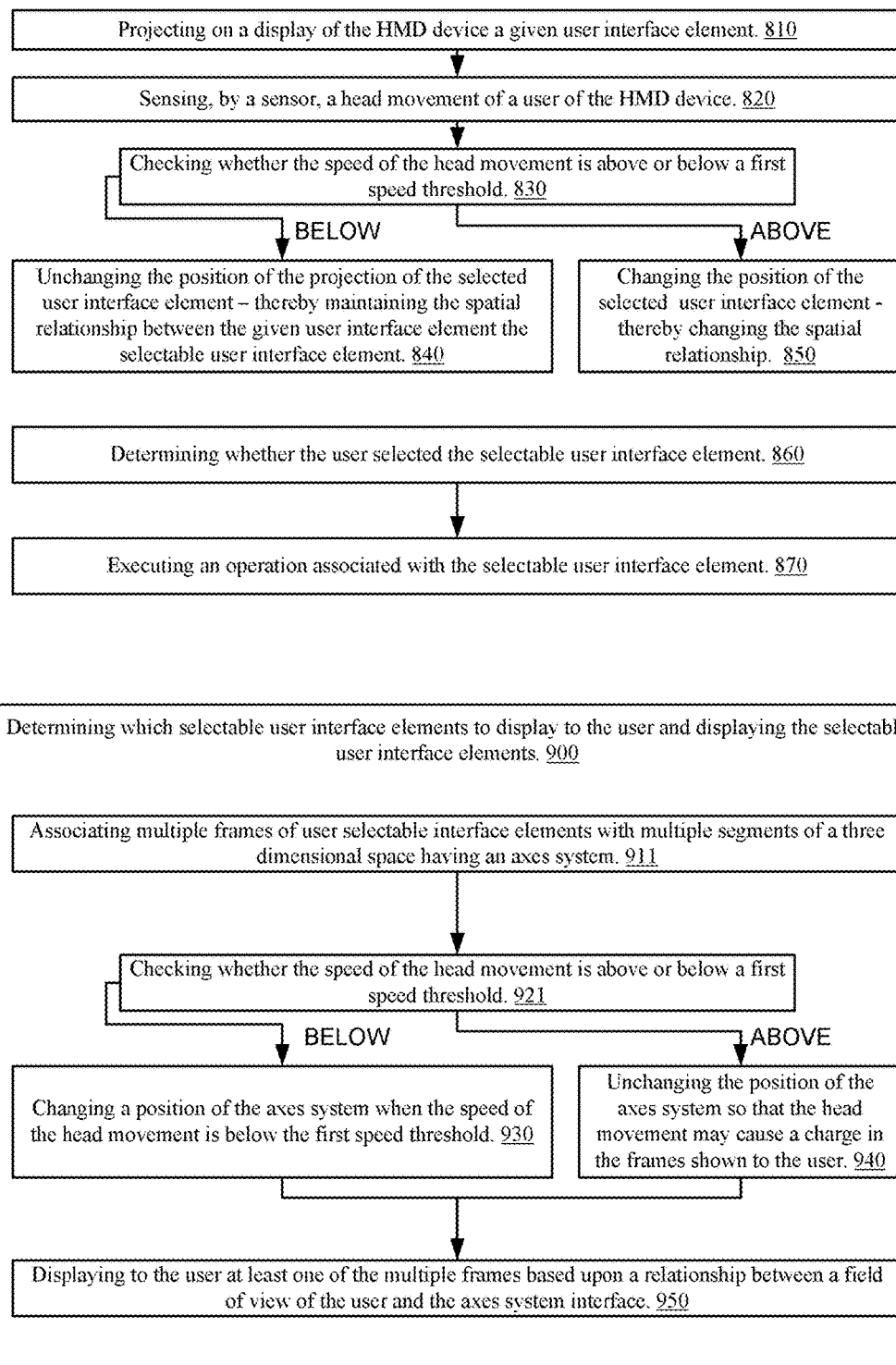
FIG. 8 illustrates a method according to an embodiment of the invention.

FIG. 8 illustrates a method 800 according to an embodiment of the invention.

Method 800 starts by step 810 of projecting on a display of the HMD device a given user interface element.

Step 810 may be followed by step 820 of sensing, by a sensor, a head movement of a user of the HMD device.

Step 820 may be followed by step 830 of checking whether the speed of the head movement is above or below a first speed threshold.

The first speed threshold may be fixed, may change over time, may be set regardless of the user, may be set and/or adapted based upon the user identity, history of user head movements, can be set by the user or another entity, and the like.

If the speed of the head movement is below the first speed threshold then step 830 may be followed by step 840 of unchanging the position of the projection of the selected user interface element—thereby maintaining the spatial relationship between the given user interface element the selectable user interface element.

It is noted that the given user interface element may belong to a frame of user interface elements that are displayed on the display. The position of member of the frame of user interface elements may remain unchanged when the head movement is below the first speed threshold.

When the HMD device also shows the user its environment then the environment may change even when the speed of the head movement is below the first speed threshold.

If the speed of the head movement is above the first speed threshold then step 820 may be followed by step 850 of changing the position of the selected user interface element—thereby changing the spatial relationship between the given user interface element the selectable user interface element.

Step 850 may include tracking the head movement.

According to an embodiment of the invention, method 800 may also include step 860. These steps may be executed in parallel to steps 810, 820, 830, 840 and 850.

Step 860 may include determining whether the user selected the selectable user interface element.

Step 860 may include determining that the user selected the selectable user interface element when the given user interface element and the selectable user interface element overlap for a predefined overlap period. The overlap may be a 100% overlap or at least an overlap of the majority (or any threshold) of overlap.

The required overlap and the duration of the predefined overlap period may provide a tradeoff between false selections and the duration of the selection process. Longer predefined overlap period may reduce false selections but may make the selection process awkward.

When determining that the user selected the selectable user interface element then step 860 may be followed by step 870 of executing an operation associated with the selectable user interface element.

Method 800 may also include step 880 of detecting that the head of the user remains still for a predefined reset period (during which there is no overlap between the given user interface element and any selectable user interface element) and resetting the display—configuring the display according to a reset configuration. The reset configuration may be set in advance. The reset configuration may be an initial configuration determined by the application that is being executed by the HMD device.

Method 800 may also include step 900 of determining which selectable user interface elements to display to the user and displaying the selectable user interface elements.

According to an embodiment of the invention the determination may be responsive to the head movement of the user. Non-limiting examples of such determination were shown in FIGS. 13-15.

According to an embodiment of the invention, step 900 may include steps 911, 921, 930 and 940.

Step 911 includes associating multiple frames of user selectable interface elements with multiple segments of a three dimensional space having an axes system.

Step 911 may be followed by step 921 of checking whether the speed of the head movement (tracked during step 820) is above or below a first speed threshold.

If the speed of the head movement is below the first speed threshold then step 921 may be followed by step 930 of changing a position of the axes system when the speed of the head movement is below the first speed threshold. In this case the user may see the same frame regardless of his head movement. The axes system may follow the head movement.

If the speed of the head movement is above the first speed threshold then step 921 may be followed by step 940 of unchanging the position of the axes system so that the head movement may cause a charge in the frames shown to the user.

Steps 930 and 940 may be followed by step 950 of displaying to the user at least one of the multiple frames based upon a relationship between a field of view of the user and the axes system interface.

It is noted that the user interface element may be displayed by the HMD device over an augmented reality.

According to an embodiment of the invention there may be provided a system, method and computer readable medium for feedback based remote maintenance during which a user (such as but not limited to a field technician) may receive feedback (such as annotations) from another user (such as an expert) to its head mounted display HMD which may be a binocular head mounted display (BHMD), a see-through head mounted display (STHMD) and even a see-through binocular head mounted display (STBHMD). The feedback may include annotations that are overlaid by the HMD over an image seen by the field technician. The feedback may be requested by the field technician and/or may be sent to the field technician without receiving such a request. For example, the expert may receive the image (still images or video) seen by the user and send feedback to the user. The feedback will be overlaid on the image seen by the user.

Figure 44:
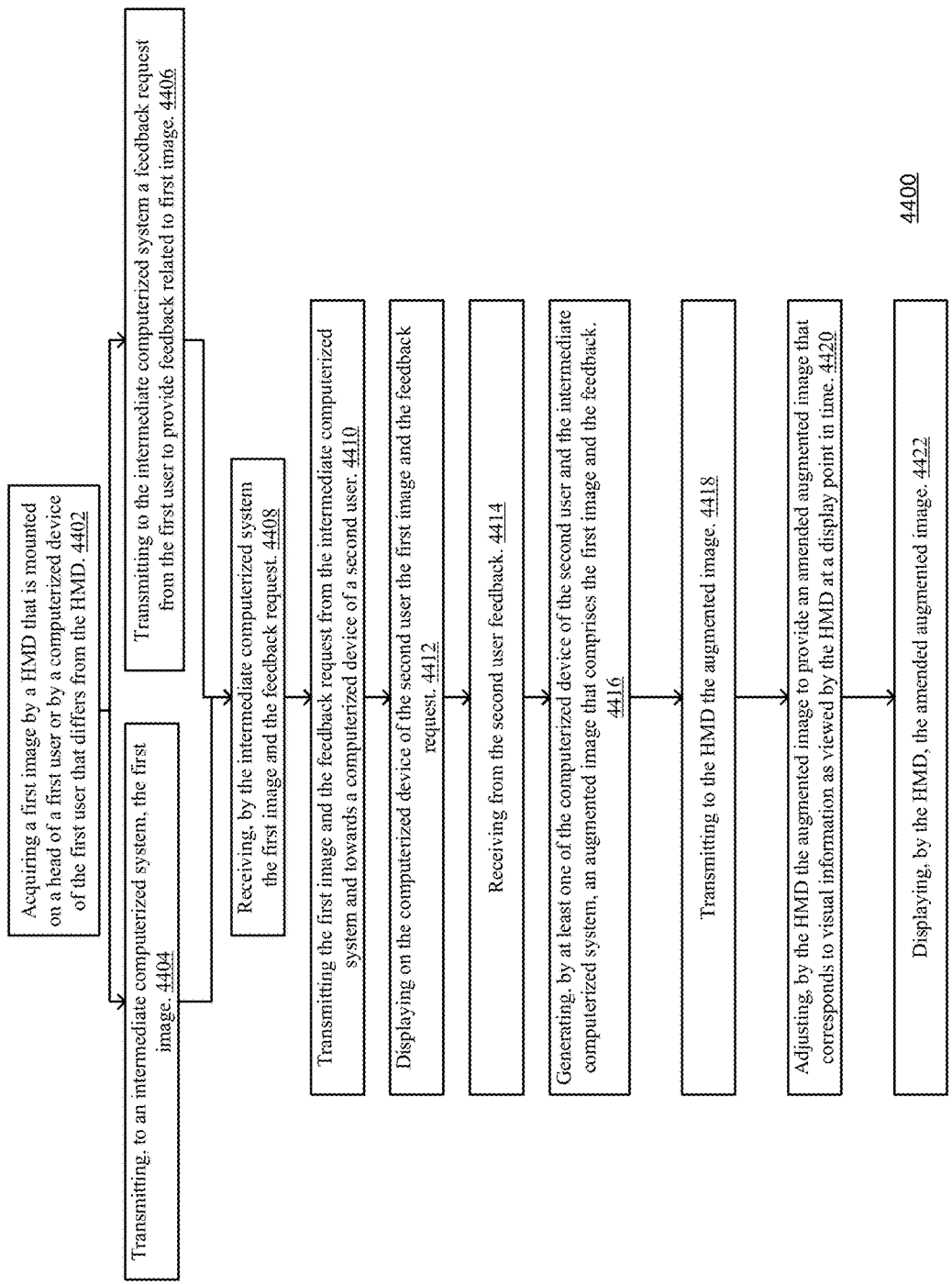
FIGS. 44-46 illustrate a method according to an embodiment of the invention.
Figure 45:
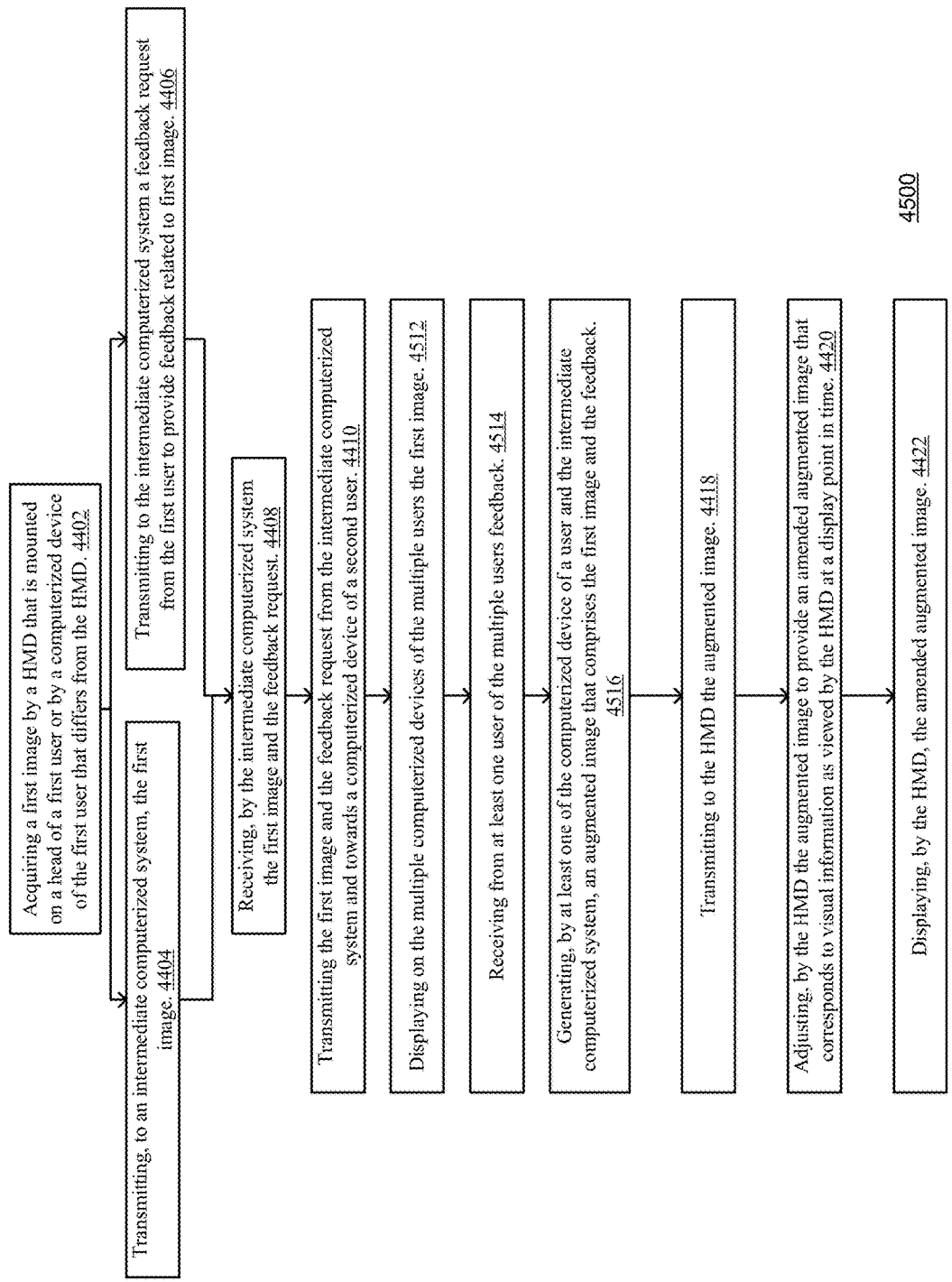
Figure 46:
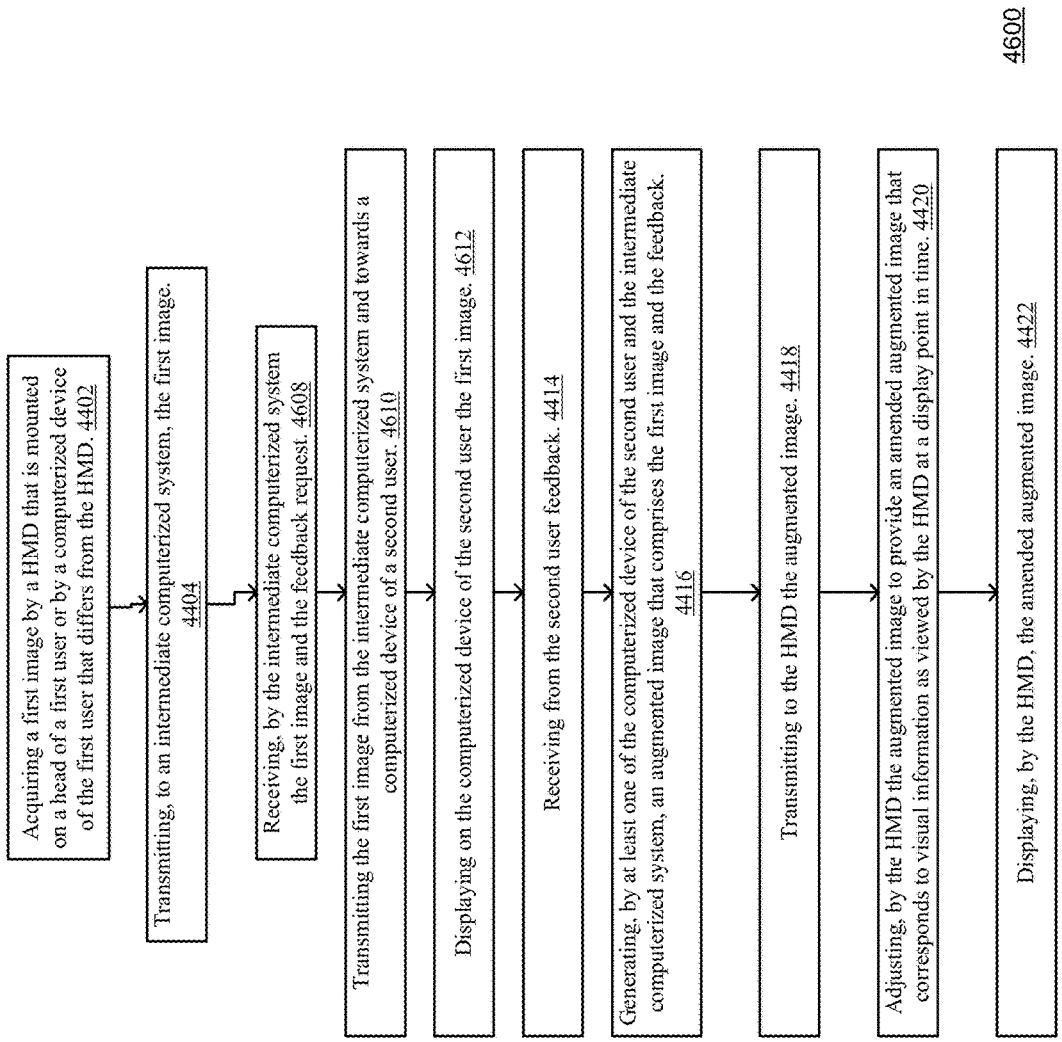

FIGS. 44-46 illustrate various method such as method 4400, method 4500 and method 4600 according to various embodiments of the invention.

Method 4400 may start by step 4402 of acquiring a first image by a head mounted display (HMD) that is mounted on a head of a first user (for example—a field technician) or by a computerized device of the first user that differs from the HMD.

The first image may be part of a video stream, part of a group of images or a single image. The first image is acquired at an acquisition point of time.

Step 4402 may be followed by steps 4404 and 4406.

Step 4404 may include transmitting, to an intermediate computerized system, the first image.

The intermediate computerized system may be a could environment server or any other computerized system that may be remotely located from the first and/or second users.

The first image may be transmitted from the HMD to the intermediate computerized system via a network (for example a wireless local area network such as a WiFi compliant network or any other wireless LAN, via a cellular network, and the like. The HMD may transmit (for example using a short range transmission) the first image to a computerized device of the first user (laptop computer, tablet, mobile phone, and the like) that it turn may transmit the first image towards the intermediate computerized system.

Step 4406 may be include transmitting to the intermediate computerized system a feedback request from the first user to provide feedback related to first image.

Step 4404 and 4406 may be merged and the first image may be transmitted along with the feedback request. Alternatively, the first image and the feedback request may be transmitted at different times, through different channels and the like.

Steps 4404 and 4406 may be followed by step 4408 of receiving, by the intermediate computerized system the first image and the feedback request.

Step 4408 may be followed by step 4410 of transmitting the first image and the feedback request from the intermediate computerized system and towards a computerized device of a second user.

Step 4410 may be followed by step 4412 of displaying on the computerized device of the second user the first image and the feedback request.

Step 4412 may be followed by step 4414 of receiving from the second user feedback.

Step 4414 may be followed by step 4416 of generating, by at least one of the computerized device of the second user and the intermediate computerized system, an augmented image that comprises the first image and the feedback.

Step 4416 may be followed by step 4418 of transmitting to the HMD the augmented image.

Step 4418 may be followed by step 4420 of adjusting, by the HMD the augmented image to provide an amended augmented image that corresponds to visual information as viewed by the HMD at a display point in time.

Step 4420 may be followed by step 4422 of displaying, by the HMD, the amended augmented image.

While FIG. 44 illustrates that the second user responded to the display of the first image by providing the feedback, the second user may decide not to provide the feedback but rather to send the first image and the first request to one or other users—such as a third user. The second user may also decide to provide feedback and relay the first image (and even the second user feedback) to a third user—in order to provide additional feedback to the first user.

FIG. 45 illustrates method 4500 according to an embodiment of the invention.

Method 4500 differs from method 4400 by including various steps such as step 4510 of include broadcasting (or otherwise transmitting) the first image and the feedback request from the intermediate computerized system towards multiple computerized devices of multiple users (that differ from the first user). The multiple users may include the second user.

Method 4500 may start by step 4402. Step 4402 may be followed by steps 4404 and 4406.

Steps 4402 and 4404 may be followed by step 4406.
Step 4406 may be followed by step 4408.
Step 4408 may be followed by step 4510.
Step 4510 may be followed by step 4512 of displaying on the multiple computerized devices of the multiple users the first image.
Step 4512 may be followed by step 4514 of receiving from at least one user of the multiple users feedback.

Step 4514 may be followed by step 4516 of generating, by at least one of the computerized device of a user and the intermediate computerized system, an augmented image that comprises the first image and the feedback.

Step 4516 may include generating the augmented image based upon feedback from one or more users that provided feedback, may include responding only to the first (or any predefined number) received feedback.

Step 4516 may be followed by a sequence of steps 4418, 4420 and 4422.

Yet according to another embodiment of the invention the feedback is generated even without the transmission of the feedback request.

Method 4600 may start by step 4402 of acquiring a first image by a head mounted display (HMD) that is mounted on a head of a first user (for example—a field technician).

Step 4402 may be followed by step 4404.

Step 4404 may include transmitting, to an intermediate computerized system, the first image.

Steps 4404 may be followed by step 4608 of receiving, by the intermediate computerized system the first image. The feedback request is not sent to the intermediate computerized system.

Step 4608 may be followed by step 4610 of transmitting the first image from the intermediate computerized system and towards a computerized device of a second user.

Step 4610 may be followed by step 4612 of displaying on the computerized device of the second user the first image.

Step 4412 may be followed by step 4414 of receiving from the second user feedback.

Step 4414 may be followed by step 4416 of generating, by at least one of the computerized device of the second user and the intermediate computerized system, an augmented image that comprises the first image and the feedback.

Step 4416 may be followed by step 4418 of transmitting to the HMD the augmented image.

Step 4418 may be followed by step 4420 of adjusting, by the HMD the augmented image to provide an amended augmented image that corresponds to visual information as viewed by the HMD at a display point in time.

Step 4420 may be followed by step 4422 of displaying, by the HMD, the amended augmented image.

Any one of methods 4400, 4500, and 4600 may include multiple iterations that may include exchanging queries and questions between the first and second (or more users).

Appendix A is a non-limiting example of a user manual of a system names Fieldbit Coach system and includes an HMD that may include a smartglasses and a control box, has an intermediate computerized system that is a cloud environment server and has a computerized device that is a smartphone.

APPENDIX A

Fieldbit Coach is a unique, enterprise-grade, software solution that combines Augmented Reality (AR) technology with real-time video and cloud-based computing to enable on-line collaboration between field service personnel wearing smartglasses and experts supporting them from other locations.

With Fieldbit Coach, experts using smartphones can provide over-the-shoulder coaching and timely digital information to technicians in the field—information that is displayed right in front of their eyes, leaving the technicians' hands free to perform their tasks.

Features

The main features of the Fieldbit Coach system include:

a. True hands-free mode—no need to use the smartglasses' controller b. A dedicated user interface that uses head gestures and sight tracking for simple and intuitive interaction with smartglasses c. Field technicians can capture, view, and send a picture/video of the problem, while hands remain free d. Real-time video integrates with augmented reality to allow a mobile service expert with a smartphone to observe and guide a service person from afar e. Annotations editor on smartphone lets expert add useful comments and markings to the picture f. Augmented reality annotation is displayed on smartglasses in both Optical See-through and Camera modes g. Field technicians and experts can re-assign or escalate an open ticket to another expert h. Fieldbit cloud server controls communication flow between the field technician and expert, enabling online chats and storing the entire session for future reference and editing i. Robust security protocols protect on-line communication and data System Architecture The basic architecture of Fieldbit Coach system is shown in the following FIG. 1.

In general, data flows between the devices of the expert and remote technician via the Fieldbit cloud server.

User Device Requirements

The remote technician is equipped with smartglasses, a smartphone, and the Fieldbit Coach applications for both devices. The expert uses a smartphone and the Fieldbit Coach application for smartphones.

Smartphone: The Fieldbit application for smartphones can be installed on any smartphone running Android operating system, version 4.0 and up.

Smartglasses: The Fieldbit application for smartglasses is installed on the Epson Moverio™ model BT-200 smartglasses. The BT-200 smartglasses consist of a headset and a controller device that is connected to it via a cable:

For a complete description of the parts and accessories of the smartglasses, refer to the *Epson BT-200 User's Guide* or the *Epson BT-200 Start Guide* for instructions.

Typical Workflow a. To provide a general understanding of how the system is employed, a typical workflow scenario between a field technician (equipped with a pair of smartglasses and smartphone) that requires assistance and a responding expert from a different location (equipped with smartphone) is outlined in FIGS. 1-9.

b. At a remote site, a field technician requires assistance in repairing a malfunctioning piece of equipment. With his smartphone, the technician opens a new ticket (service assistance chat session). He then uses either his smartphone or smartglasses to add a picture or video of the problem to the ticket.

c. Communication is via the Fieldbit cloud server. This enables the field technician to select individual experts or a particular group from a list. If not available, ticket can be reassigned to another expert.

d. The responding expert views the picture on his smartphone application and assesses the problem. Using the annotation editor, the expert adds text, shapes, pointers, or freehand shapes to the picture. The expert then sends it back to the field technician.

e. On the field technician's smartglasses, the expert's annotations are displayed as augmented reality objects over the faulty part to help the technician locate and perform the repair.

f. The entire ticket session is stored on the Fieldbit cloud server for reassignment or systemized in the organization for future reference.

Intended Audience

This document provides a description of the Fieldbit Coach applications running on smartphone and smartglasses, as well as instructions for performing common operations with those devices.

This document is intended for field technicians and experts using the Fieldbit Coach solution, including smartglasses, smartphones, application for smartglasses, application for smartphones, cloud server, and cloud software.

Installation and First-Time Use

This chapter describes how to perform the required installation and initial procedures. Once they have been completed, you can begin using the Fieldbit Coach solution. These procedures do not need to be repeated each time you use Fieldbit Coach.

The procedures include:

Connecting to the Internet a. Installing the Fieldbit Coach application on the smartphone and then logging in (both experts and field technicians)

b. Logging in to the smartphone application c. Installing the Fieldbit Coach application on the smartglasses (field technicians only)

Connecting to the Internet

The Fieldbit Coach application software is provided as an SaaS (from the cloud), thus both the smartglasses and the smartphone need to be connected to the Internet in order to install and run the applications.

a. Connect the smartphone to the Internet.

b. Connect the smartglasses to an available Wi-Fi network. (Refer to Operations>Initial Settings>Setting up network in the *BT-200 User's Guide* for instructions.)

If there is no Wi-Fi network available to connect the smartglasses to the Internet, the smartphone can provide this functionality via its cellular network connection.

Installing the Smartphone Application

For both experts and field technicians, the Fieldbit Coach application software needs to be installed on the smartphone.

a. On your smartphone, search for the Fieldbit Coach application on Google Play.

b. Select the application. It installs automatically.

When the installation is completed, the Fieldbit Coach application icon is added to your smartphone Apps Drawer.

You are then prompted to open the application.

Logging in to the Smartphone Application

When you purchase the Fieldbit Coach license, you receive a username and password for each license. Contact the Fieldbit sales representative to receive the usernames and passwords for your licenses.

Figure 16:
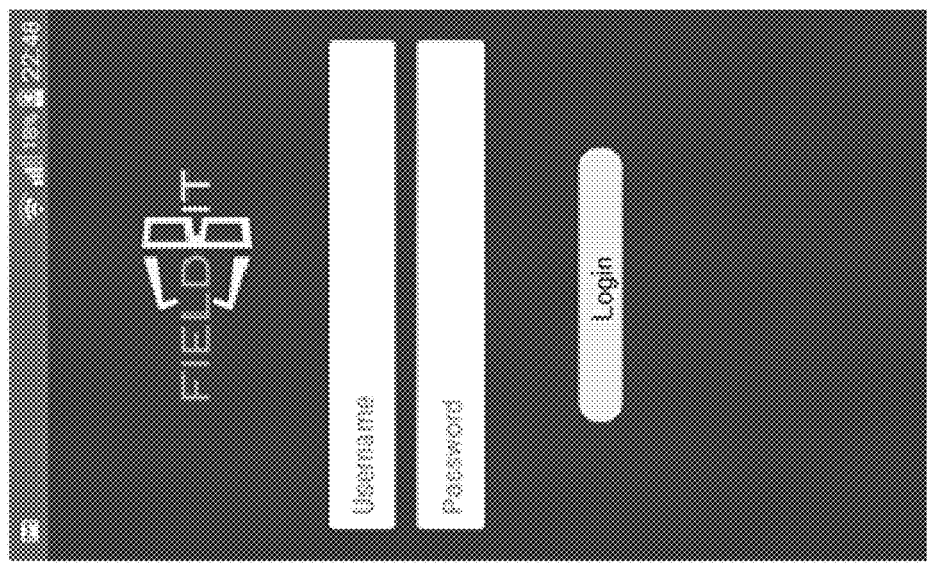
FIGS. 16-21 and 23-27 are screen shots of images displayed on a smartphone according to an embodiment of the invention.
Figure 17:
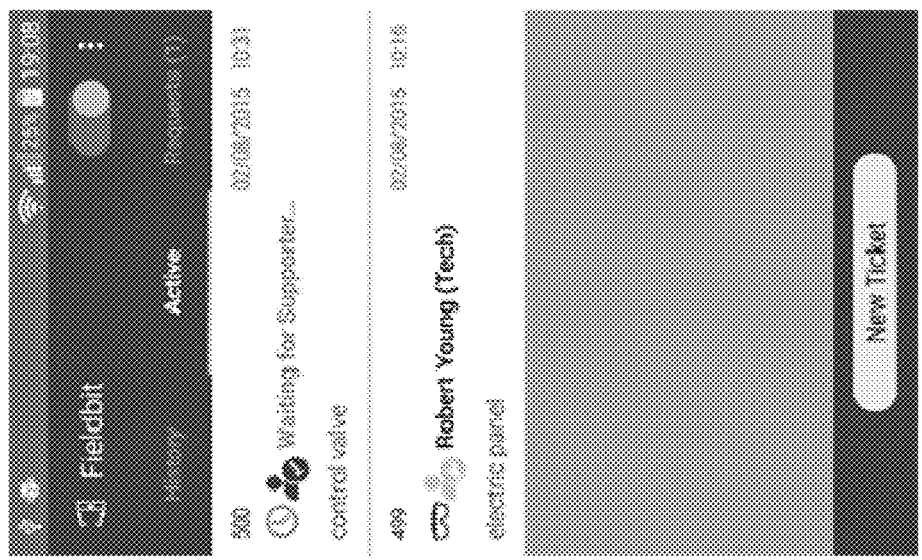

To log in to the application:

a. On your smartphone home screen or Apps drawer, select the Fieldbit Coach application icon.

b. The Fieldbit Coach application Login screen is displayed (FIG. 16).

c. Enter your username and password.

d. After you have successfully logged in, the Tickets screen is displayed (FIG. 17).

Installing the Smartglasses Application

Figure 18:
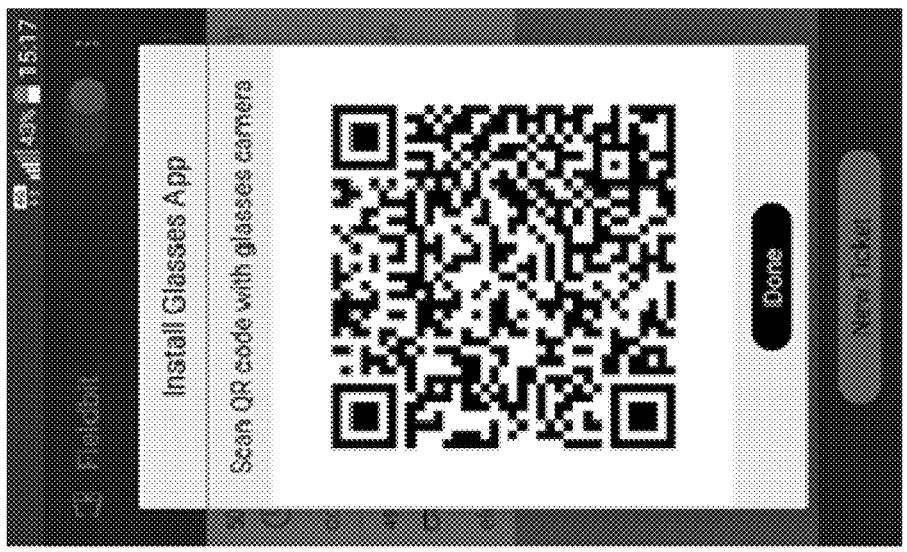

The Fieldbit Coach smartglasses software installation is initiated from the field technician's smartphone.

a. On your smartphone, log in to the Fieldbit Coach application.
b. At the top of the Tickets screen, select the Options icon and then select the Install Glasses App option. A QR Code is displayed on the smartphone screen, similar to FIG. 18.
c. Put on the smartglasses headset and switch it on.
d. Using the smartglasses controller, select the Settings icon on the Home screen. From the Setting menu, select Security.
e. Select the Install from unknown sources checkbox, then exit the Settings screen.
f. Using the smartglasses controller, select the camera icon on the Home screen.
g. When the camera launches, select the scanner option.
h. Hold the smartphone in front of you and focus on the displayed QR Code. After the link is identified, you are prompted to download the application.
i. Start the download. When the download is complete, you are prompted to install the application.
j. Start the installation. A few moments later, the Fieldbit Updater application is downloaded to your smartglasses. The Updater application notifies you of the availability of new Fieldbit Coach application versions Immediately after the Updater is downloaded and activated, a message appears in the smartglasses notifications tray indicating that "Fieldbit updates are pending.
k. Select the message to download and install the Fieldbit Coach application updates.

After the update is complete, you can start the application. The Fieldbit Coach application icon is added to the smartglasses Home screen the first time you start the application.

Using Fieldbit Coach on the Smartphone

This chapter explains how to perform the various activities that the field technician (with both smartphone and smartglasses) and the expert (with smartphone only) can perform using the Fieldbit Coach application.

Figure 19:
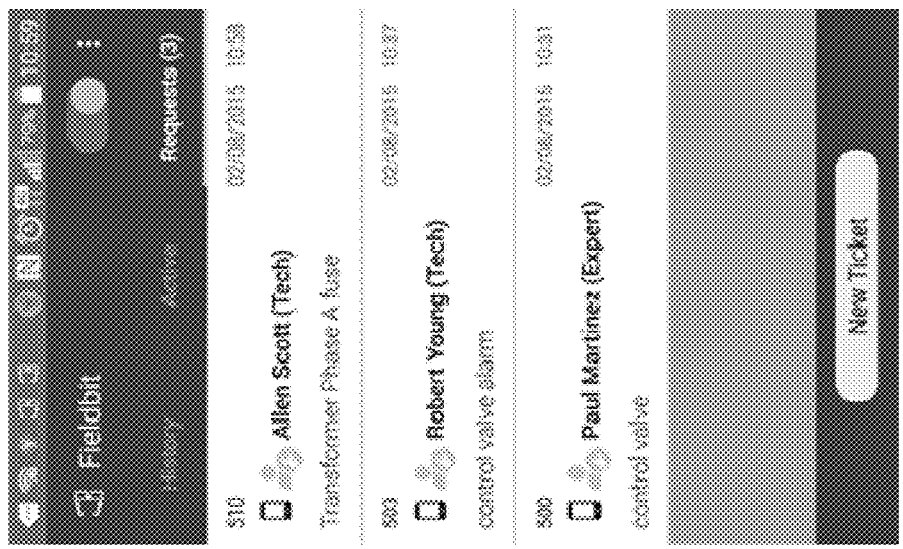

The main screen of the smartphone application is referred to as the Tickets screen and is illustrated in FIG. 19.

The Tickets screen contains three tabs:
a. The History tab lists closed ticket sessions that you initiated or supported.
b. The Active tab lists the open ticket sessions that you initiated or supported.
c. The Requests tab lists unanswered requests for support that are addressed to you (number of requests appears on the tab).

From the Tickets screen, you can:
a. Open a new ticket
b. Respond to a ticket

Opening a New Ticket

New ticket sessions are opened in the smartphone application.

To open a new ticket:
a. Access the Fieldbit Coach application on the smartphone.
b. At the bottom of the Tickets screen, select New Ticket. A new ticket is created.
c. Enter the ticket information: site, equipment and model, and then select Next.
d. The Add Photo & Description screen is displayed.
e. Select the camera icon to take a new photo of the target object with the integral camera, or to add an existing photo from the gallery.
f. Enter a description of the problem. This text will be displayed along with the picture when it is later viewed on the smartglasses.
g. Select Next. The Pick Ticket Recipients screen is displayed.
h. Select the checkbox(es) of one or more expert recipients, then select Send Ticket Request. The Ticket chat session opens. The system sends a request for support to the selected recipient(s). The new ticket is added to the Requests tab with a unique ID number. A "Waiting for Supporter" message is displayed on the ticket until the recipient responds.

Responding to a Ticket Request

Figure 20:
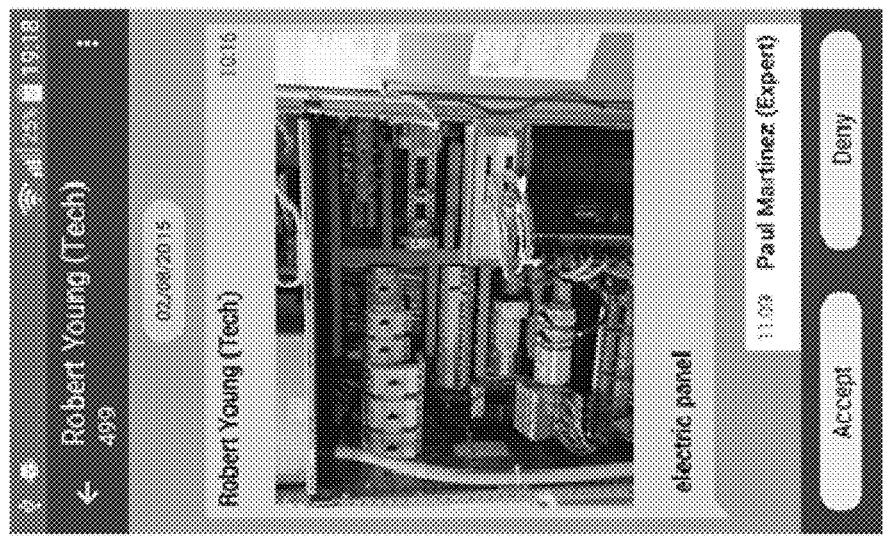

When a field technician selects you as a Ticket recipient, you receive a notice on your smartphone that a new support request has been addressed to you. (See FIG. 20)

To respond to a ticket request:
a. Access the Fieldbit Coach application.
b. In the Tickets screen, on the Requests tab, select a ticket to open a ticket chat session.
c. Select Accept to join the session or Deny to reject the request.

If you accept the ticket, it is moved to your Active tab. If you reject it, the ticket is deleted from your Requests tab.

The field technician waiting on the other side is notified that the expert has accepted or rejected the ticket.

If requests for support are sent to multiple recipients, the first recipient to answer joins the ticket session. The requests for support are then automatically deleted from the Requests tabs of the other recipients.

You (the expert) can now:
a. View the picture of the target object taken by the field technician
b. Make AR annotations on the picture
c. Add text instructions
d. Send the AR annotations and instructions back to the field technician.

Making AR Annotations on a Picture

As an Expert user, you can add multiple annotations to an image using the Fieldbit application on your smartphone.

Figure 21:
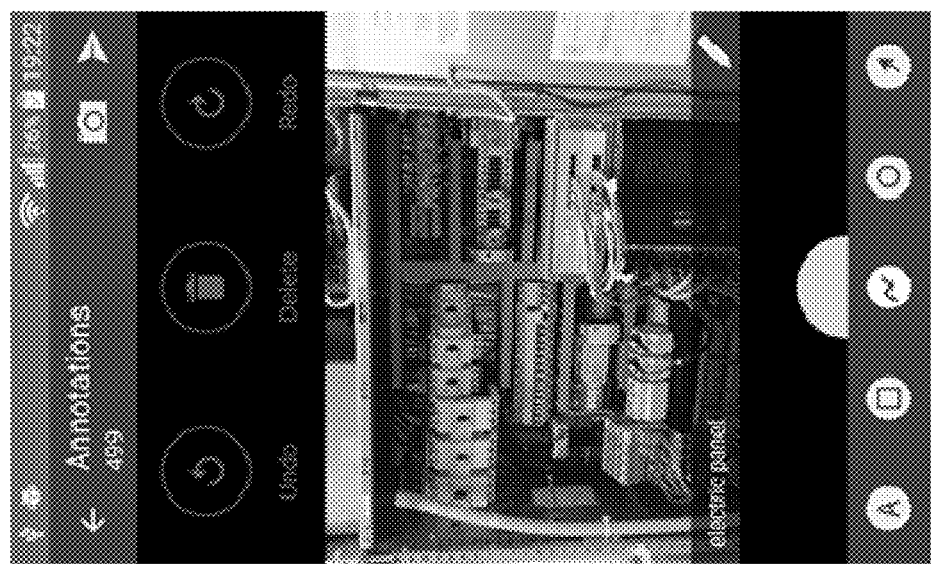

To make annotations:
a. From an open ticket session, select an existing image (or add a new image by selecting the camera icon at the top of the screen).
b. The image opens in the Annotations editor (FIG. 21). Adding annotations is intuitive. Simply select one of the tools and then draw it on the image with your finger. Once you add an annotation to the image, you can change its size, location or color. You can add multiple annotations to an image, as shown in FIG. 22.
c. Using the available tools, add annotations to the image as required. After making your annotations to the image, add it to the Ticket session so that others (for example, the field technician) can view it.
d. From the top of the Tickets screen, select the send icon to add the annotated picture to the session. Notification is automatically sent to the field technician.

Live Video

The Fieldbit coach application enables displaying the live camera feed from the technicians' smartglasses on the expert's smartphone screen. This lets the expert see exactly what is happening in front of the field technician's eyes. This function is initiated and controlled by the expert.

Communication between the Fieldbit coach application users is normally asynchronous. However, supporting the live video function requires synchronous timing. This means that while the expert is using the live video option, he is not able to deal with other tickets. If he leaves the current ticket session, the video feed is closed.

Viewing Live Video

As an expert, you can view live video feed from the field technician's smartglasses.

Figure 23:
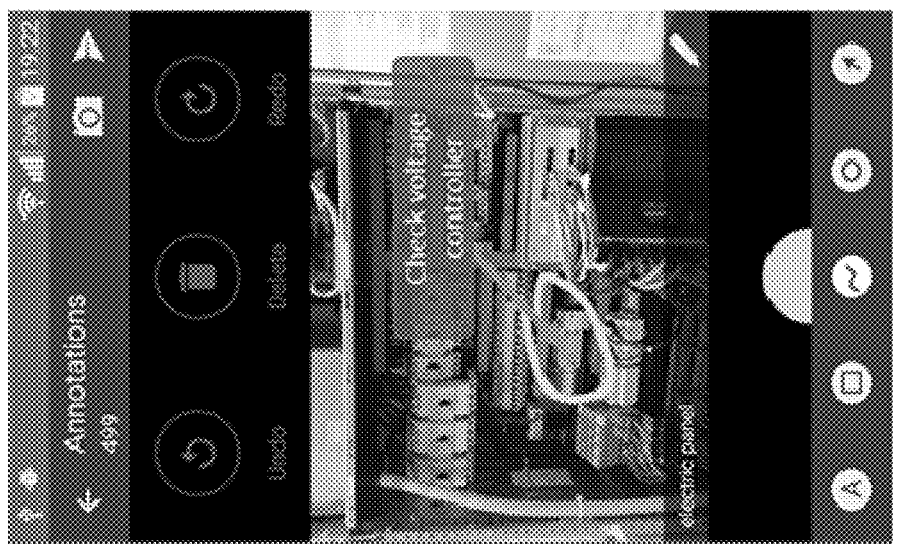

To start the live video:

a. On the experts' smartphone, open the Ticket session.
b. From the top of the expert's smartphone screen, select the live video icon. The live video feed is displayed in the top half of the screen—as seen in FIG. 23.
c. To exit the live video feed, select the live video icon again, or exit the ticket session.

Live Video Options

The live video screen includes the following options:

a. Audio ON/OFF—Controls if you want hear the sound from the technicians environment.
b. Microphone ON/OFF: Controls if you want the remote technician to hear the sound from your environment.
c. Snapshot: Captures a screenshot of the video feed.

After taking a snapshot, you are prompted to either delete the image or annotate it:

a. If you select Annotate, the captured image opens in the annotation editor. You can add annotations to the captured image and send it to the technician. After you send the annotated snapshot, the field technician will see it when he looks at the target object with his smartglasses.
b. If you select X, the captured image is discarded and you return to the live video feed. You can now take another snapshot or continue watching the video.

Ticket-Related Tasks

Adding a Message to a Ticket

You can add a free-text message to an open ticket.

To add a message to ticket:

a. From the bottom of the screen, select Add a message.
b. Use the displayed touchscreen keyboard to enter your message.

Adding a Picture to a Ticket

You can add a picture to an open ticket, for example, a picture of the hardware you are working on.

To add a picture to ticket select the Camera icon at the top of the screen and then use the camera to take a new photo, or instead select an existing image from the gallery Viewing Ticket Details You can view the ticket information (site, equipment and model) of an open Ticket session.

To view ticket details—From the open ticket session, select the Options icon at the top of the screen and then select Ticket info. The ticket details are displayed (they cannot be modified).

Closing a ticket—When the issue that was the subject of the ticket has been resolved, or is no longer relevant, you can close the ticket. Both experts and field technicians can close tickets.

To close a ticket—From the open ticket session, select the Options icon at the top of the screen and then select Close ticket. The ticket is removed from the Active tab of both the expert and the field technician.

Reassigning a ticket—If the person (expert) that is currently assigned to the ticket is not currently able to provide support, the ticket can be reassigned to someone else.

To reassign a ticket:

a. From the open ticket session, select the Options icon at the top of the screen and then Reassign ticket. The Reassign Ticket screen is displayed.
b. Select the checkbox of a new expert, and then select Send Ticket Request.

The system sends a request for support to the selected recipient. The person previously assigned the ticket receives a message that the ticket has been reassigned.

A "Waiting for supporter" message is displayed on the ticket until the recipient responds.

Once the new recipient opens the Ticket request, you will be notified that the expert has accepted or rejected the ticket.

Changing Online/Offline Status

You can change your availability status to "offline" so that you will not receive notifications from the application. When you are offline, your name is masked in the Pick Ticket Recipients list of other Fieldbit Coach application users.

Your online status is indicated by a switch at the top of the Tickets screen.

To go offline, move the switch to the left (grey). To go online, move the switch to the right (green).

Viewing Help & about Information

The Help & About screen contains the information on the logged in user, the glasses ID number, the application version, licensing information, and terms of service.

Figure 24:
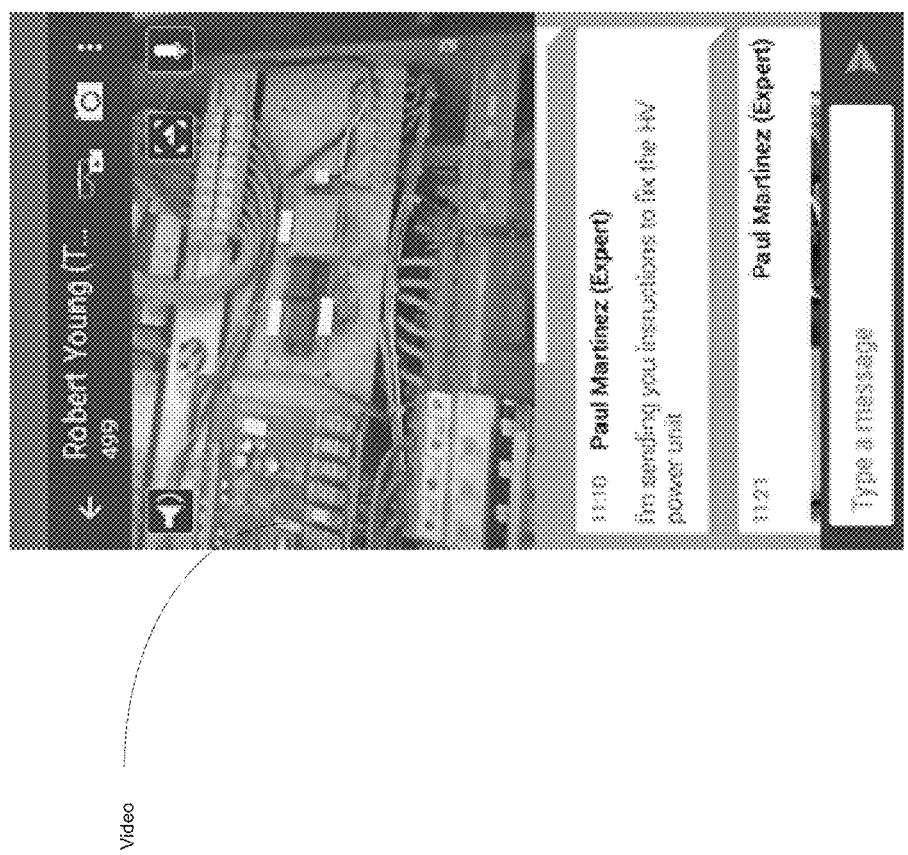

To display the Help & About screen:

At the top of the Tickets screen, select the Options icon and then select the Help & About option. The window that is opened is included in FIG. 24.

In addition, you can send logs directly to Fieldbit for troubleshooting by selecting the Send Logs option. Use this option if you have experienced technical problems with the application.

Select Terms of Use to read legal information about using the application.

Logging Out

To log out of the application:

At the top of the Tickets screen, select the Options icon and then select the Logout option. The next time that you want to use the application, you will need to Log in.

Pairing Smartglasses with Your Smartphone

This activity is initiated from the smartphone application and enables pairing the smartglasses with your smartphone. For pairing the smartglasses with your smartphone, the smartglasses should be connected to the Internet.

Connect the Smartglasses to the Internet

Figure 25:
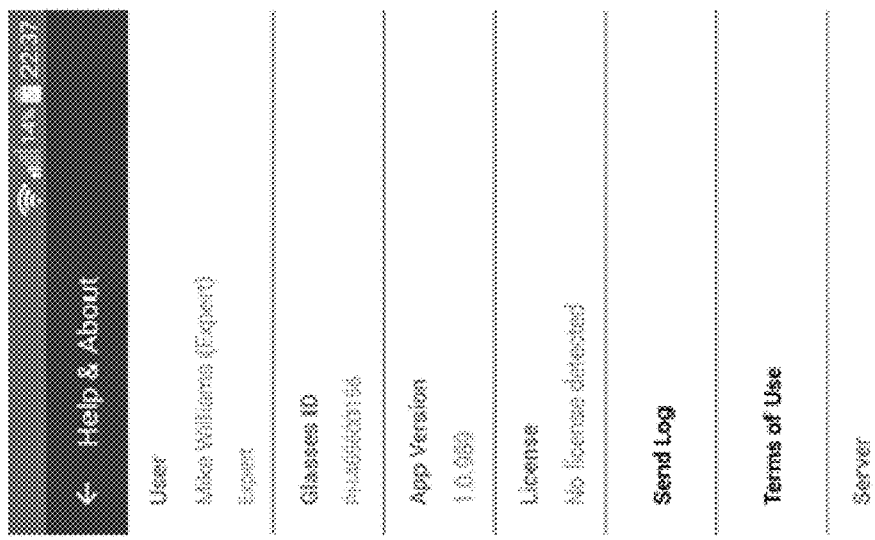

Fieldbit Coach application on your smartphone provides an easy way to connect your smartglasses to the Internet via your smartphone Hotspot or via any available WiFi. Follow the instruction below for connecting the smartglasses to the Internet:

a. At the top of the Tickets screen, select the Options icon and then select the Glasses Login menu.
b. Select Connect Glasses to the Internet option. The list of available WiFi networks will be displayed (FIG. 25). Select one of the WiFi network or activate your smartphone Hotspot. (FIG. 25)
c. If a local WiFi is selected, then you should provide network credentials. If the Hotspot option is selected then you should toggle the Hotspot button to activate the Hotspot. A QR Code will be generated on the smartphone. This QR Code is used to login to Fieldbit Coach with smartglasses. Reference to the section
d. Login to Fieldbit Coach on smartglasses for more information.

Login to Fieldbit Coach on Smartglasses

Figure 26:
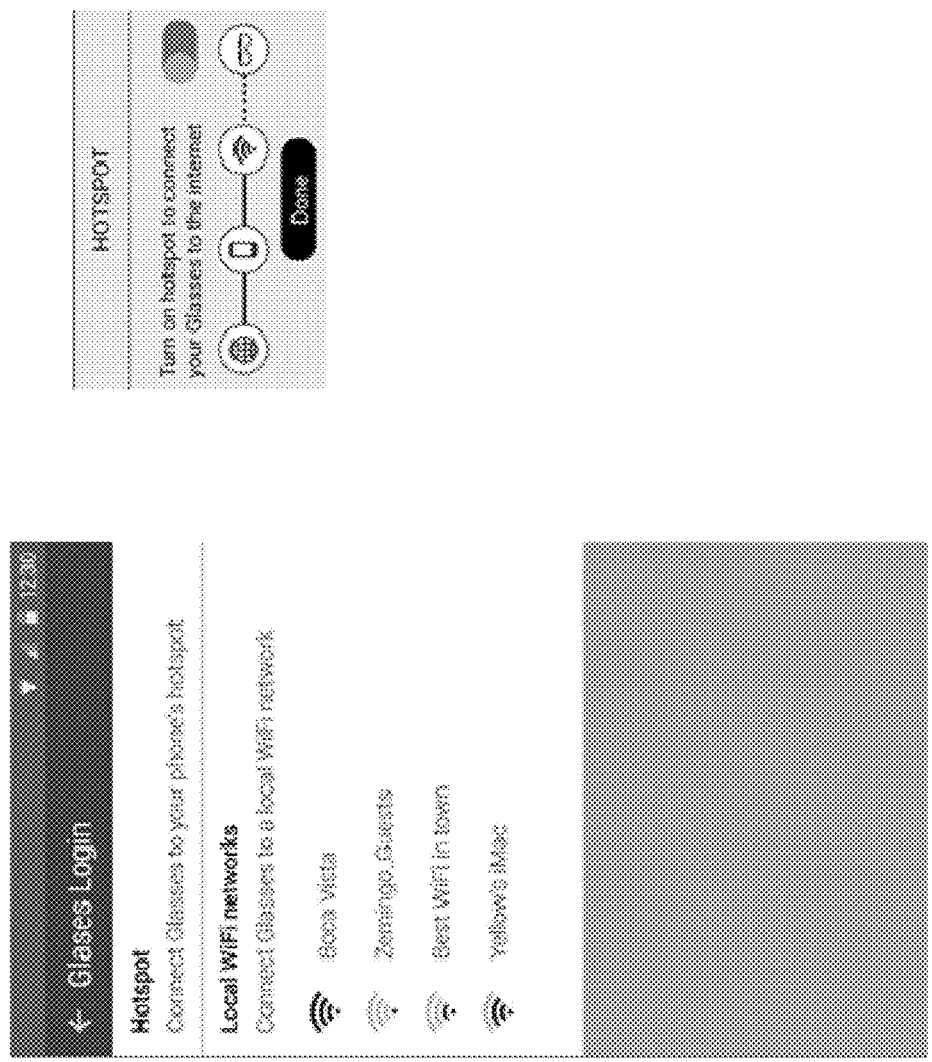

After selecting Connect Glasses to the Internet or Login option in the Glass Login menu the QR Code will be displayed on your smartphone as shown in FIG. 26.

Figure 27:
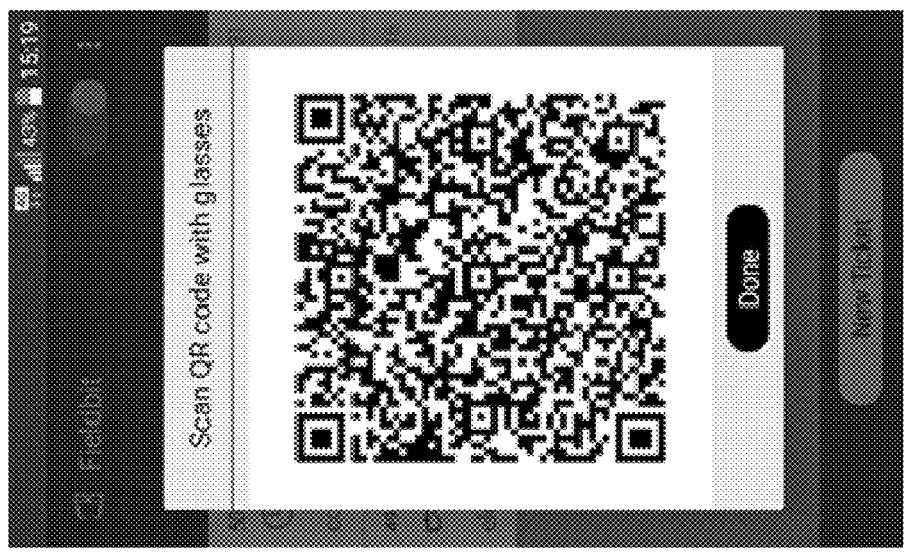
Figure 28:
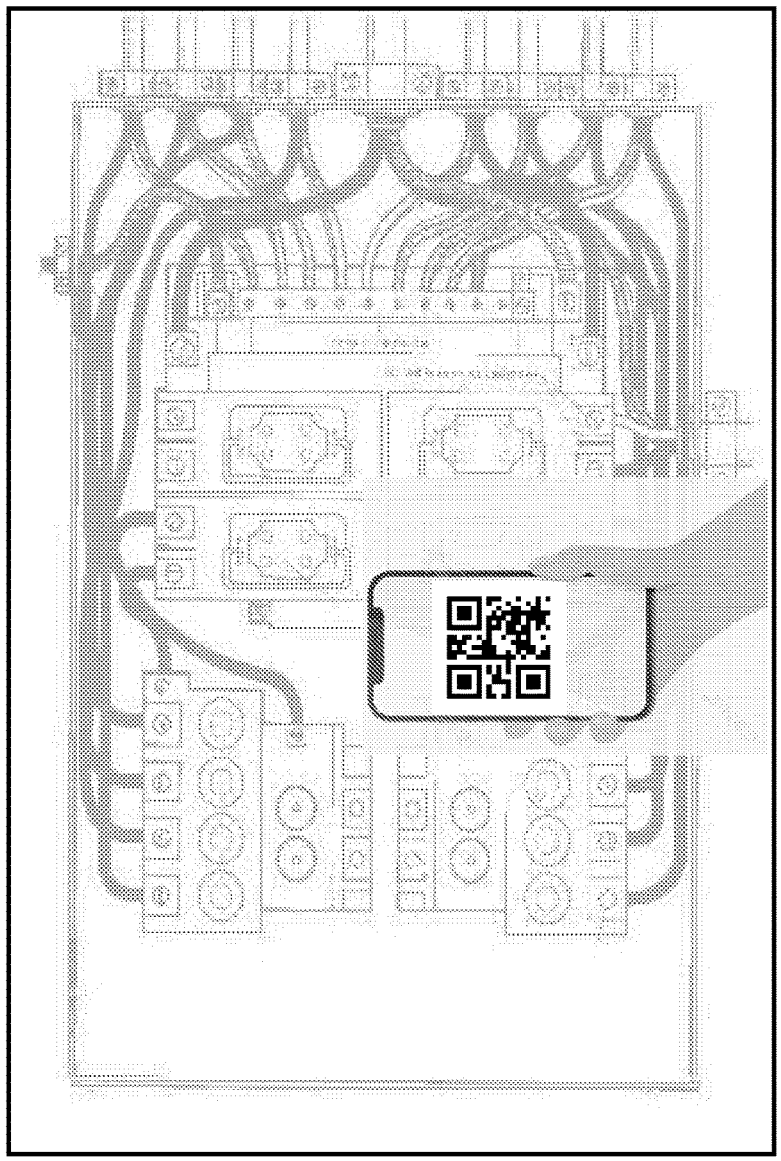
FIGS. 28-30 and 35-41 illustrate screen shots of the display of a smartglasses according to an embodiment of the invention.

Follow the instructions below to scan the QR Code with smartglasses and login to the Fieldbit Coach application on the smartglasses:

a. Put on the smartglasses headset and start Fieldbit Coach.
b. By default, the Fieldbit Coach smartglasses application opens in the Camera See-through view mode. In this mode, the live feed from the smartglasses camera appears on the Fieldbit Coach application screen.

c. Focus the smartglasses pointer on the QR code displayed on the smartphone as displayed on the picture of FIG. 27.

d. After a few moments, the Fieldbit Coach application GUI is displayed on the smartglasses and you are logged in to the Fieldbit Coach smartglasses application.

The Fieldbit Coach smartglasses and smartphone applications are interlinked so that the same ticket session is displayed on both the smartphone application and the smartglasses.

Login as the Current User

Once the user has logged in the Fieldbit Coach application on the smartglasses, the application will remember the user credentials and will not require generating and scanning a QR Code again. The following screen will appear on smartglasses and will display the current user name.

You can continue with the same user or login with the different user.

If the user selects to login with the different user name, he will need to generate QR Code on his phone as described in the section Login to Fieldbit Coach on smartglasses.

Figure 29:
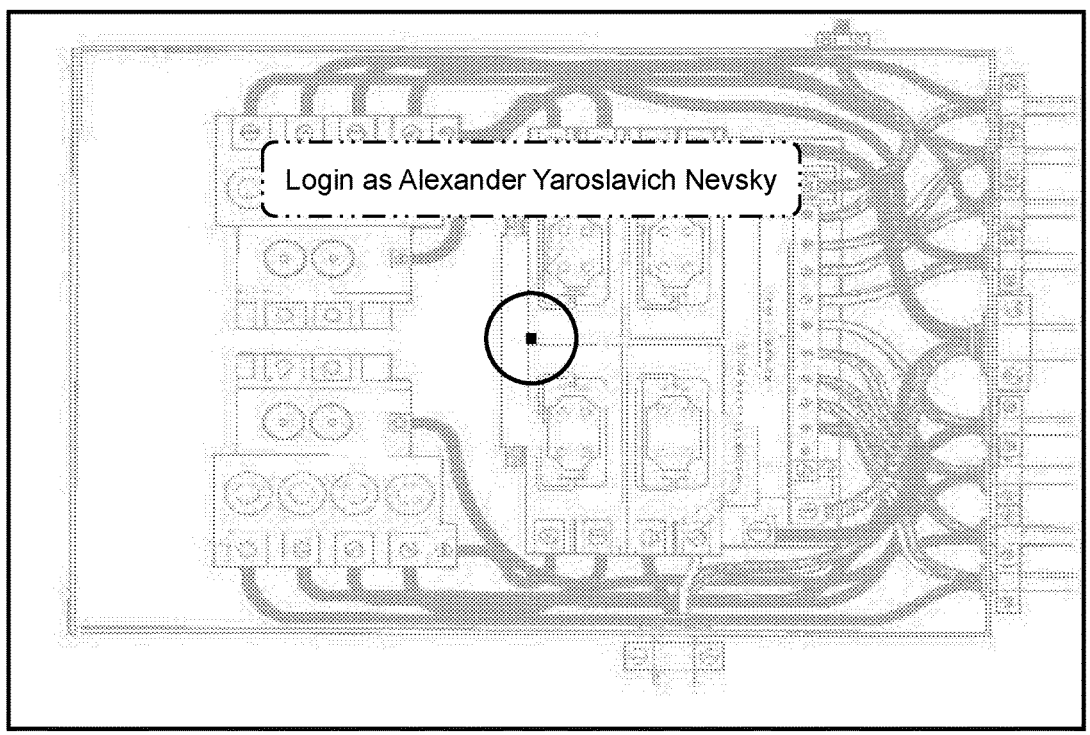

FIG. 29 illustrates a login screen.

Fieldbit Coach UI/UX on Smartglasses

After you have accessed and logged in to the Fieldbit Coach smartglasses application using the smartglasses controller, you can lock the controller by pushing the top button to the right (see the BT-200's Users Guide for details), and then put it in your pocket. You do not need to use the controller again until you finish using the smartglasses and want to power off.

Figure 30:
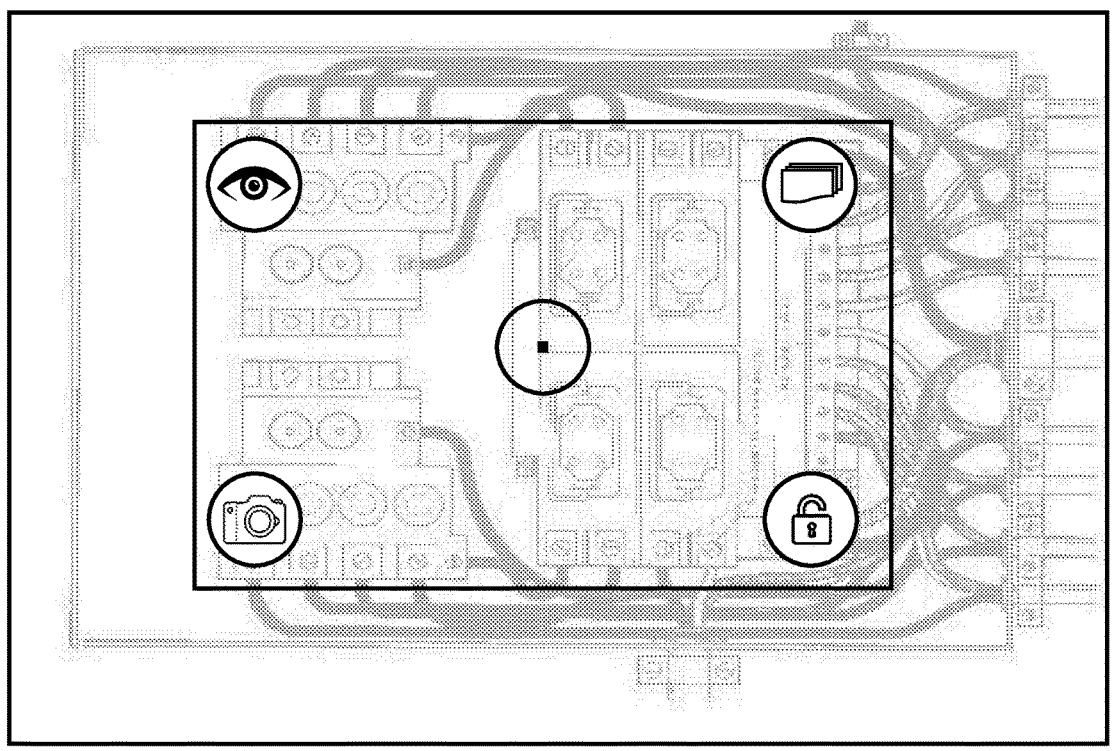

When you look through the smartglasses, you see the Fieldbit Coach Application screen projected in the foreground (inside the simulated white framed rectangle in FIG. 30).

The Fieldbit application smartglasses screen includes various tools and indicators. You navigate on the smartglasses screen by moving your head up and down, left and right.

You select an object on the screen by moving the pointer (Sight Pointer) from the center of the screen and placing it over the desired icon.

UI Components

Figure 33:
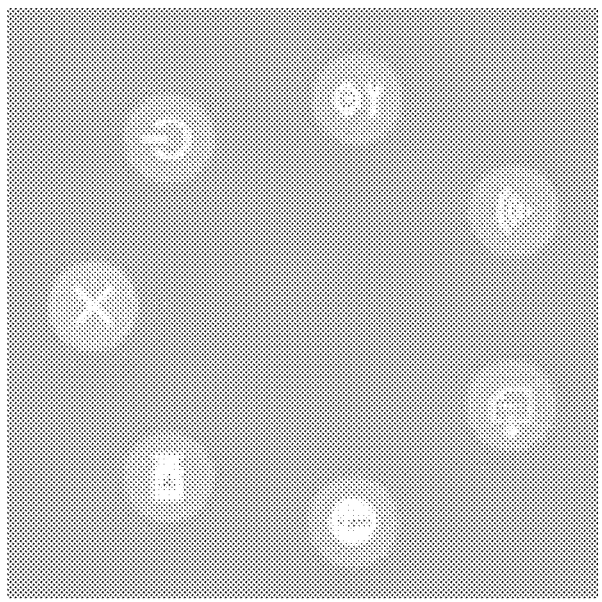

The Fieldbit Coach application for smartglasses GUI includes a variety of tools as shown in FIG. 33.

Setting Icond

When the Settings icon is selected, the following options are displayed as illustrated in FIG. 34.

Viewing AR Annotations with Smartglasses

As a Field Technician, you can view the annotated images added to an open ticket session by an Expert. This activity is performed with both smartphone and smartglasses.

After the expert adds an annotated image to the session, you receive notification on your smartphone and smartglasses. You can then view it with your smartglasses.

The Fieldbit Coach applications on smartglasses can display AR annotations for different target objects. Target object pictures are stored on the smartglasses and each time the Fieldbit Coach detects the new target object, the associated AR annotations are displayed.

Figure 35:
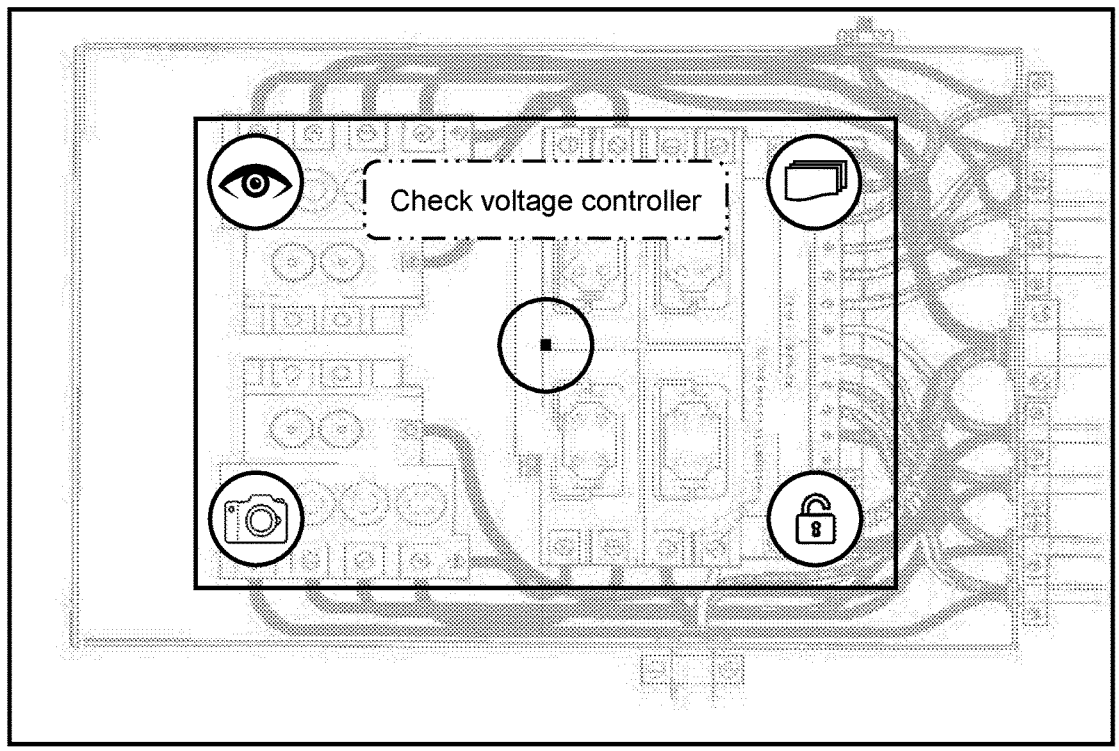

To view AR annotations with the Smartglasses:

a. Open the ticket containing the new image on your smartphone application, and put on the smartglasses headset. The Fieldbit Coach smartglasses and smartphone applications are interlinked so that the same ticket session is opened on the smartphone application and smartglasses.

b. By default, the Fieldbit Coach smartglasses application opens in the Camera Feed view mode. In this mode, what you see in the Fieldbit Coach application is actually the live feed from the smartglasses camera.

c. Look at the target object. When the Fieldbit Coach smartglasses application matches the target object in the received image with the real object in your field of view, it displays the AR annotations over the real object. When you move your focus away from the target object, the AR annotations disappear. See FIG. 35.

If you want to see the image with the AR annotations displayed in a fixed position in your field of view no matter where you look, change the view mode to Fixed Display. This mode is useful when you are not in front of the target object and for displaying reference material, such as plans, diagrams or instructions.

If you want to see the received annotations displayed over the object in your natural field of view (rather than over the live camera feed), change the view mode to Optical See-through.

If the AR annotations do not appear properly scaled or seem to be projected in the wrong location when using the Optical See-through view mode, the new picture needs to be calibrated.

New pictures need to be calibrated only once. If you view the same image again in the future, recalibration will not be necessary Taking Photos with Smartglasses Fieldbit lets you utilize the smartglasses' integral camera to take and send photos to a ticket session while keeping your hands free.

To Take Photos with the Smartglasses

Place the pointer over the camera icon until the countdown icon appears. Then, put the target object inside your field of view to capture the scene. When the countdown finishes the photo is taken. You are then prompted to send the photo, cancel the operation, or take another picture.

Select Send.

The new picture is added to the current ticket session.

View Modes

There are three modes for viewing AR annotations for the target object on the smartglasses. Each mode is described below.

Optical See-Through Mode

In this mode, the AR annotations are displayed over the matching target object in your field of view. This mode is unique to the BT-200 binocular smartglasses.

The AR annotations appear when you are looking at the target object at a suitable distance and direction (the application must be able to see and identify the target object).

You should use this mode when you are positioned close to the target object (about arm's reach away) and want to view the AR annotations while interacting with the target object. See FIG. 35.

Camera See-Through Mode

In this mode, the AR annotations are displayed over the matching target object in your field of view together with the live camera feed. This mode is similar to the traditional AR experience with smartphones and tablet computers.

The AR annotations only appear when you are looking directly at the target.

Figure 36:
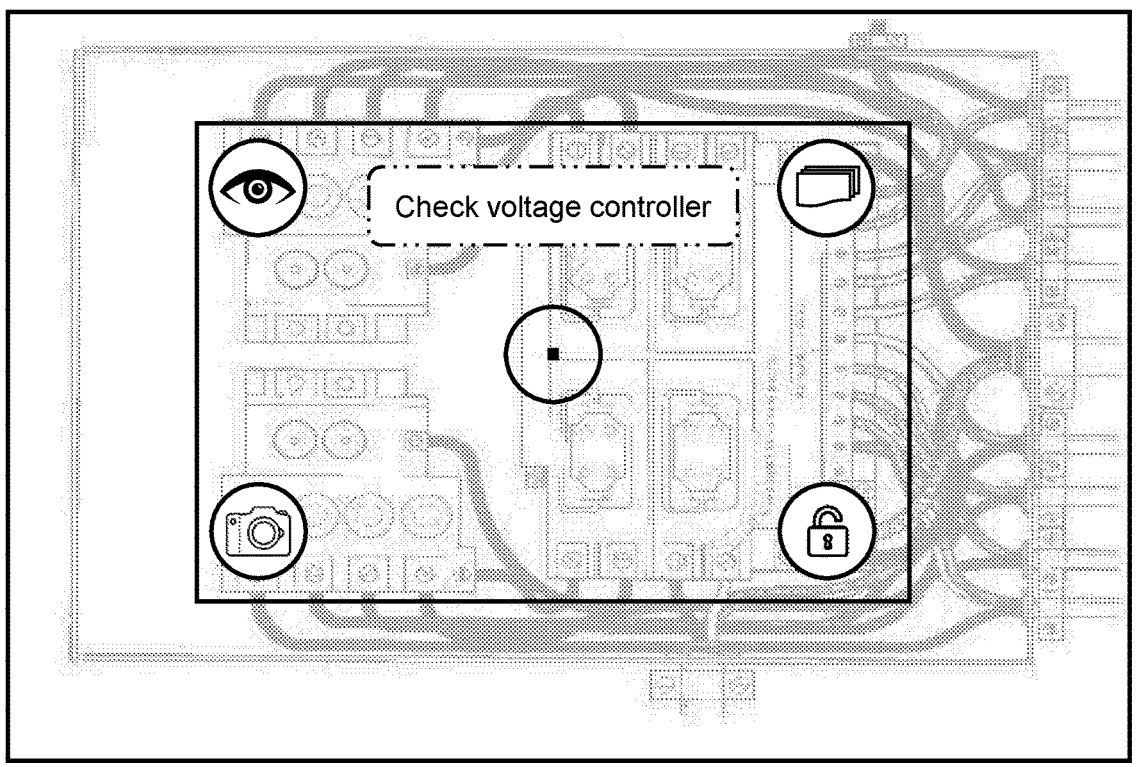

You should use this mode when looking at the target object from farther away. See FIG. 36.

Fixed Display Mode

This mode displays the image in your smartglasses field of view as if it were fixed in place. In this mode, there is no matching to the target object, meaning that you can see the annotations as static pictures even if you are not looking at the target object.

Use this mode when you are not located in front of the target object. You can also use this mode to display other digital material not related to the target object image, such as plans, diagrams, or instructions.

New Picture Calibration (Optical See-Through Mode Only)

If you are viewing a new annotated picture with the Optical See-through mode and the AR annotations do not look properly scaled, or seem to be projected in the wrong location, the picture needs to be calibrated.

If required, the calibration is normally done only once for each picture. If you view the same image again in the future, recalibration will not be necessary.

Picture calibration is NOT required for viewing the AR annotations in Camera Feed or Fixed Display view modes.

Figure 37:
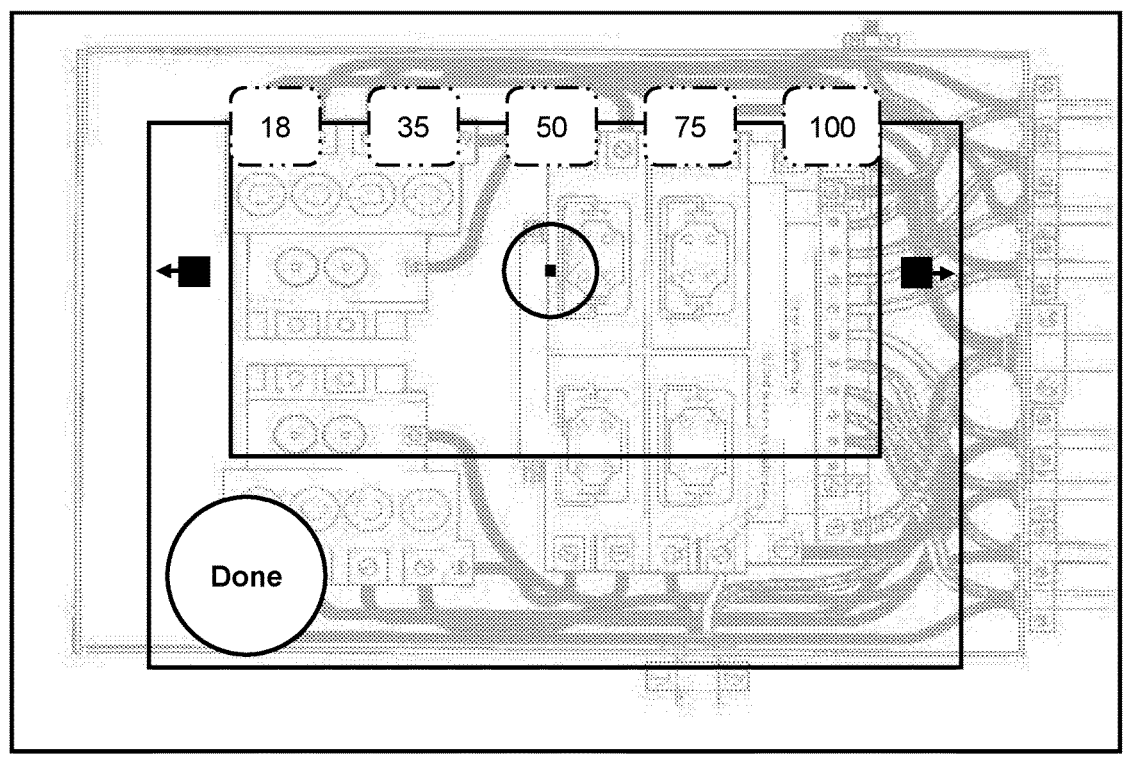

To calibrate an annotated picture:
a. In 3D Optical mode, select the Picture Calibration icon. Staggered parts of the new picture (like a checkerboard pattern) are projected in the center of the smartglasses application screen.
b. A range of preset scaling values appears at the top of the screen. When you change the setting, the projected picture changes its size. The objective is to match the partial picture to the background.
c. Stand directly in front of the real object, as close as practical (within arms-reach) and try different settings until the projected parts of the picture align well with the real object behind it as shown in FIG. 37.
d. When you have found the best fit, select Done.

Epson BT-200 Calibration

Before you use the Fieldbit Coach application with the smartglasses, you need to:
a. Adjust the smartglasses headset to fit your head properly
b. Perform a first time calibration with the smartglasses Smartglasses Headset Adjustment For optimal performance it is important that the smartglasses headset fit properly.

To properly fit the smartglasses:
a. Adjust the width and position of the nose pads so that the lenses are at eye level.
b. Put on the headset.
c. Adjust the height so that images can be viewed easily.
d. Adjust the nose pads to fit the shape of your nose.

Initial Smartglasses Calibration

Figure 38:
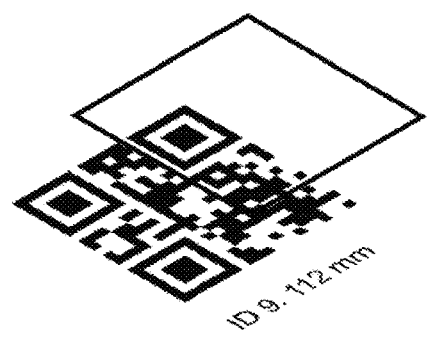

If the smartglasses are not calibrated, the Fieldbit Coach application will not be able to overlay the AR annotations properly when using Optical See-through mode. An example of a misaligned AR overlay is shown in FIG. 38

To avoid this situation, you need to perform the first-time smartglasses calibration procedure. You need to perform this procedure only once.

Figure 39:
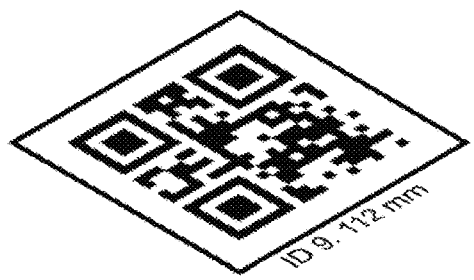

After the smartglasses have been calibrated, the Fieldbit Coach application will be able to properly align the AR annotation overlays as shown in FIG. 39

The image of FIG. 39 was taken by photographing through the smartglasses. In reality, the resulting impression is better and stereoscopic.

The smartglasses calibration procedure consists of hanging two different sized ID markers on the wall. Next, you align a virtual marker in the smartglasses view with each hung marker. This is done for each eye (left and right).

It is not mandatory to perform the calibration immediately after the application installation. However, until you perform the calibration, you will be prompted to perform it every time you access the Fieldbit application on the smartglasses.

Figure 40:
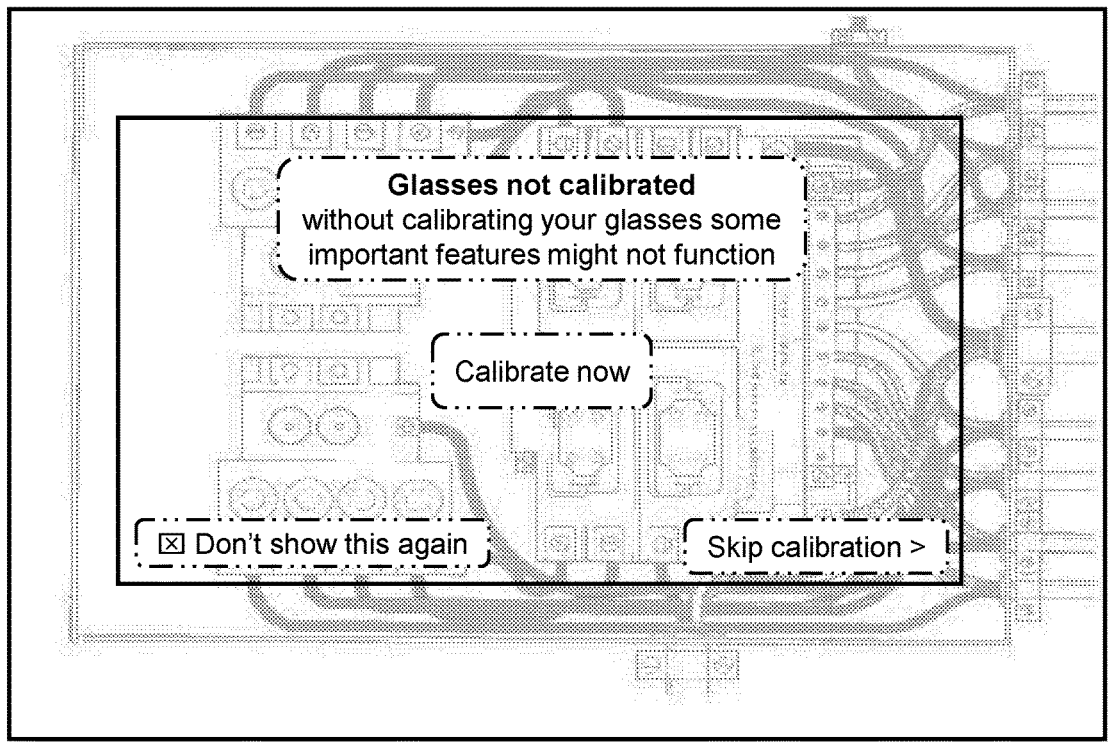
Figure 41:
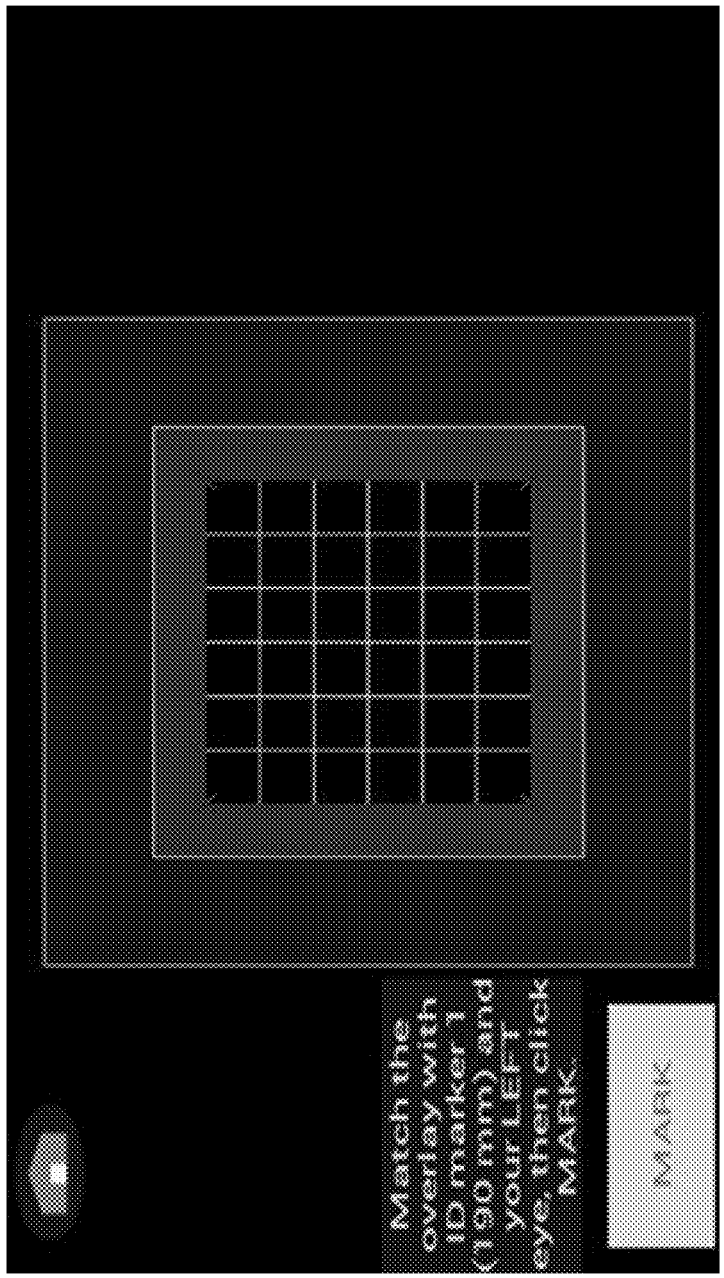

To perform first-time smartglasses calibration:
a. Print the calibration images (provided at the end of this appendix). Ensure that your printing settings are for "Actual size"—100%.
b. Verify with a ruler that the dimensions of the printed markers are correct. They should be 190 mm and 112 mm.
c. Fasten both printed markers to a flat surface (such as a wall), with the center of the markers at eye level. Make sure that the paper is flat and not bent.
d. Now you are ready to calibrate.
e. Put on the smartglasses headset. Launch the Fieldbit Coach application.
f. If the smartglasses are not calibrated, then the following screen appears on your smartglasses. Using the smartglasses controller touchpad select "Calibrate Now" button to start calibration process. See FIG. 40.
g. Using the smartglasses controller touchpad, select Start and then the Play button. FIG. 41 illustrates a screen displayed on the smartglasses (black parts represent transparent): The calibration process is intuitive. Simply follow the instructions displayed on the smartglasses.
h. Use the touch pad to position the cursor over the Mark button so you will be ready to immediately select it.
i. Looking at the ID marker target on the wall with the specified eye (left), align the virtual overlay on top of it. This can be challenging because your head is moving all the time. However, the better the match, the better the AR overlay results will be.
j. When you think you have nicely aligned them, tap the Mark button.
k. Repeat the above steps for the other eye and marker combinations, as instructed by the application. When you have completed all four calibrations, the calibration procedure is done and the application will prompt you to try the calibration directly.
l. If you are satisfied with the calibration results, tap the Save button with the controller touchpad.

The calibration data is saved. This information will be utilized by the Fieldbit Coach application in the future so that you will not have to calibrate the smartglasses again.

Figure 42:
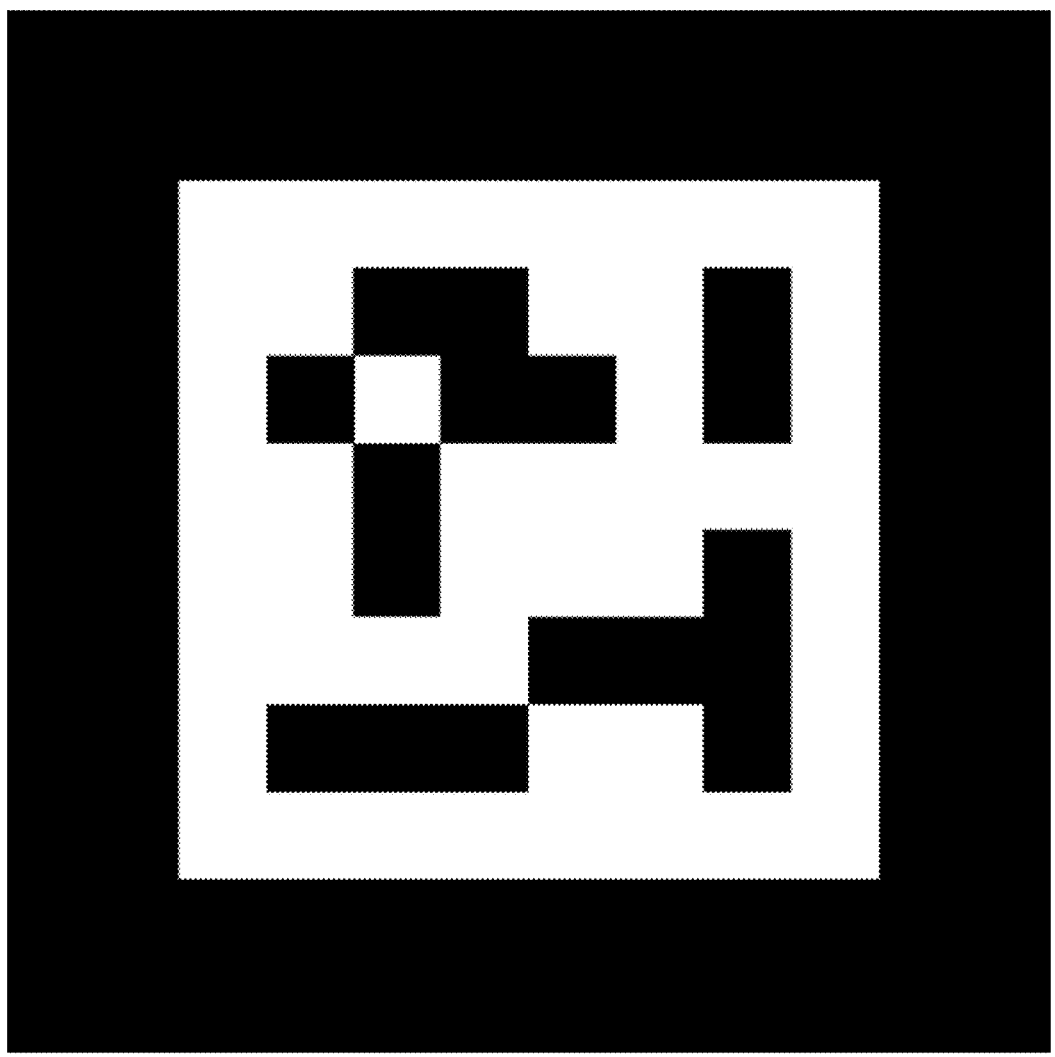
FIGS. 42-43 illustrate overlay targets according to an embodiment of the invention.
Figure 43:
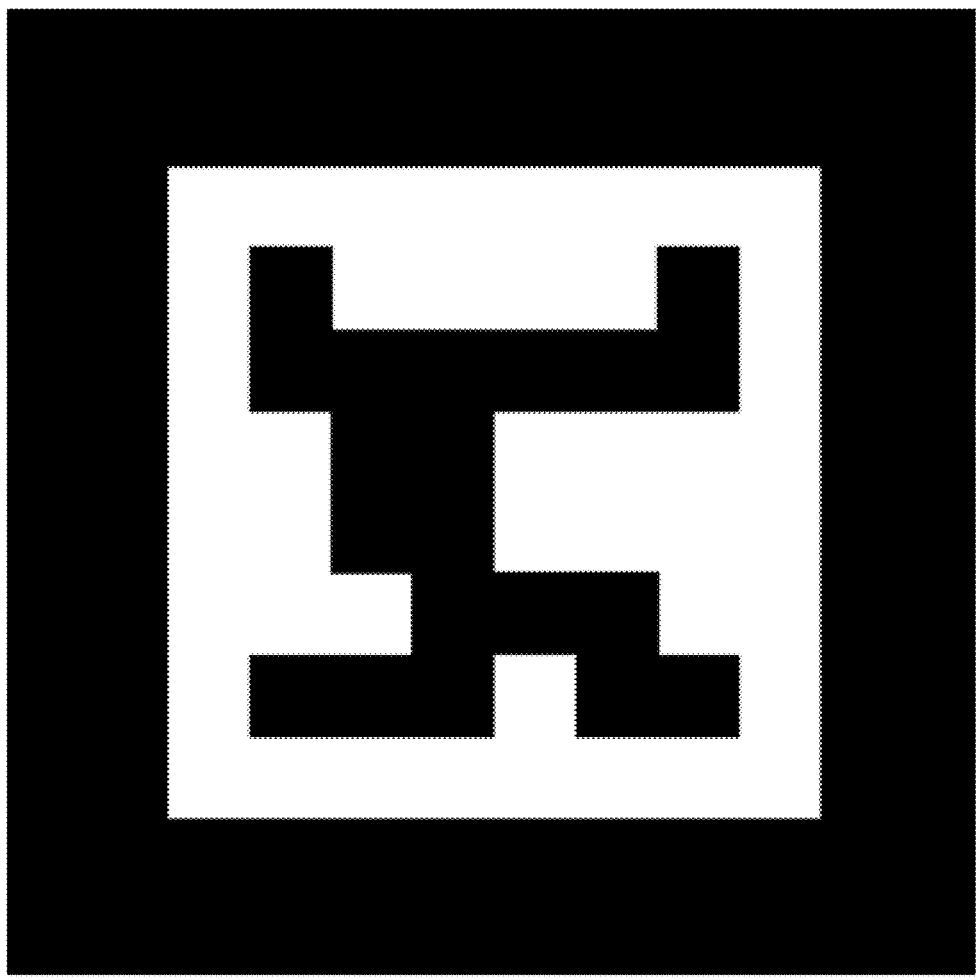

Calibration images are illustrated in FIGS. 42 and 43.

The image on the previous page is the first marker. Make sure you print it in actual size. Use a ruler to measure the above marker, it should be 190×190 millimeters.

The above image is the second marker. Make sure you print it in actual size. Use a ruler to measure the above marker, it should be 112×112 millimeters.

Glossary

AR—Augmented Reality—a technology that displays digital content on top of the target object.

AR Annotations—Text, shapes, free hand drawings and other digital contents that are associated with pictures (that were taken by the field technician) and are created by the expert using Fieldbit application for smartphones and presented in front of the eyes of the field technician.

Digital Content—Icons, elements, drawings, AR Content, and any other digital objects that are displayed on the smartglasses or smartphone.

Expert—An expert is the person that has the key technical knowledge or information to assist the field technician in performing the repair or maintenance but is located at a different location. For example, a senior technician or expert at a central site or a desktop assistant at a call center with access to the organization information base. The expert is equipped with a smartphone running the Fieldbit Coach application (no smartglasses).

The Fieldbit Coach application can be installed and used on a tablet device instead of a smartphone.

Fieldbit Coach—Fieldbit Coach is the Fieldbit solution for improving "first-time fix" ratio using smartglasses, smartphones, and the Fieldbit Coach application.

Fieldbit Coach Application—The Fieldbit Coach application consists of two parts: an application for smartphones and an application for smartglasses. The Fieldbit Coach application for smartphones is installed on both the field technician's smartphone and the expert's smartphone.

Field Technician—A field technician is the person at the equipment site that needs to perform the actual service or repair on the equipment (for example a field engineer, service provider, or equipment operator). The field technician is equipped with both a smartphone and smartglasses, with the Fieldbit Coach applications installed on both devices.

GUI—Graphic User Interface—the windows, icons, menus and other graphic elements on the Fieldbit applications for smartglasses and smartphone, by which the user interfaces with the software.

Physical Content—The real view of the equipment or other target objects as seen.

SaaS—Software as a service: software delivered to the customer from the cloud, as a service, and not by traditional means, such as on a disk. With a SaaS delivery, there is nothing to download or install, and future updates are automatic.

Smartglasses—Fieldbit Coach utilizes an optical, see-through wearable headset ("eyeglasses") connected by a cable to a separate pocket-sized controller unit. Fieldbit Coach uses the Epson Moverio BT-200 smartglasses.

Target object—The target object is the faulty equipment in front of the field technician.

Ticket—Service assistance communication session between the field technician and the expert, which is conducted on Fieldbit Coach as a chat. Each session is identified with unique tag name called a ticket.

Optical See-Through—AR annotation overlays matching target objects in your field of view.

Camera See-Through—AR annotations are displayed over matching target objects on top of a live camera feed. The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for feedback based maintenance, the method comprises:

transmitting to an intermediate computerized system a first image that was acquired, at an acquisition point of time, by a head mounted display (HMD) mounted on a head of a first user;

transmitting the first image from the intermediate computerized system and towards a computerized device of a second user; wherein the intermediate computerized system differs from the computerized device of the second user and differs from the HMD;

displaying, on the computerized device of the second user, the first image;

following the displaying, receiving feedback, related to the first image; wherein the feedback is provided by a user that differs from the first user;

generating, by the intermediate computerized system, an augmented image that comprises the first image and the feedback;

transmitting, to the HMD, the augmented image;

adjusting, by the HMD, the augmented image to provide an amended augmented image that corresponds to visual information as viewed by the HMD at a display point in time;

wherein the adjusting comprises overlaying at least a part of the augmented image over the visual information viewed by the HMD at the display point of time and matching a target object of the augmented image to the target object as appearing in the visual information viewed by the HMD at the display point of time;

wherein the overlaying of the at least part of the augmented image over the visual information viewed by the HMD at the display point of time comprises projecting staggered parts of the augmented image over the visual information viewed by the HMD at the display point of time;

and displaying, by the HMD, the amended augmented image.

2. The method according to claim 1 comprising broadcasting the first image to multiple computerized devices of multiple users.

3. The method according to claim 2 further comprising receiving feedback from users of the multiple users and responding to feedback from only a predefined number of users of the multiple users.

4. The method according to claim 2 further comprising receiving feedback from more than one users of the multiple users and responding to feedback only from a single user of the multiple users.

5. The method according to claim 1 comprising receiving by the intermediate computerized system a feedback request from the first user to provide feedback related to the first image and transmitting the feedback request to the computerized device of the second user.

6. The method according to claim 5, comprising transmitting the feedback request and the first image to the intermediate computerized system at different times and through different channels.

7. The method according to claim 1 wherein the HMD is a see-through binocular head mounted display.

8. The method according to claim 7 wherein the adjusting, by the HMD the augmented image to provide an amended augmented image is preceded by performing a calibration process based upon a certain image of an object and feedback from the first user.

9. The method according to claim 1 comprising receiving, by the intermediate computerized system, the feedback at an absence of a feedback request from the first user to provide feedback related to the first image.

10. The method according to claim 1 wherein the user that differs from the first user is the second user.

11. The method according to claim 1 comprising relaying the first image and the feedback from the computerized device of the second user to a computerized device of a third user; receiving additional feedback from the third user; and sending the additional feedback from the third user.

12. The method according to claim 1 comprising relaying the first image from the computerized device of the second user to a computerized device of a third user; and receiving the feedback from the third user and not from the second user.

13. The method according to claim 1 comprising projecting by the HMD a given user interface element and a selectable user interface element; sensing, by a sensor, a head movement of the first user; unchanging a position of the projection of the selectable user interface element when a speed of the head movement is below a first speed threshold; changing the position of the projection of the selectable user interface element when the speed of the head movement exceeds the first speed threshold; and returning the given user interface element and the selectable user interface element to an original position when sensing that the head movement is paused for predefined reset period and there is no overlap between the given user interface element and the selectable user interface element; wherein when in the original position the given user interface element is projected on a center of the display of the HMD device.

14. The method according to claim 1 comprising transmitting to the intermediate computerized system a list of expert recipients; sending requests to receive feedback to the expert recipients that are included in the list; receiving, by the intermediate computerized system, deny responses or acceptance responses from the expert recipients that are included in the list; selecting by the intermediate computerized system the second user out of one or more selected expert recipients that sent an acceptance response.

15. The method according to claim 1 wherein the first image comprises an image of the target object; wherein the displaying, by the HMD, the amended augmented image, comprises displaying the feedback when the visual information as viewed by the HMD at the display point of time includes the image of the target object; wherein the method comprises not displaying the feedback when the visual information as viewed by the HMD does not include the image of the target object.

16. The method according to claim 1 wherein the amended augmented image comprises augmented reality annotations; wherein the method comprises removing the augmented reality annotations from the augmented image when detecting that the first user moved his focus away from the target object.

17. The method according to claim 1 wherein the amended augmented image comprises augmented reality annotations related to the target object; wherein the method comprises displaying the augmented reality annotations related to the target object even when the target object is not viewed by the first user.

18. The method according to claim 1 wherein the overlaying of the at least part of the augmented image over the visual information viewed by the HMD at the display point of time comprises projecting a range of preset scaling values to the first user.

19. A non-transitory computer readable medium that once executed by a computer causes the computer to execute the steps of: transmitting to an intermediate computerized system a first image that was acquired, at an acquisition point of time, by a head mounted display (HMD) mounted on a head of a first user; transmitting the first image from the intermediate computerized system and towards a computerized device of a second user; displaying on the computerized device of the second user the first image; following the displaying, receiving feedback related to the first image by the intermediate computerized system; wherein the feedback is provided by a user that differs from the first user; generating, by the intermediate computerized system, an augmented image that comprises the first image and the feedback; transmitting to the HMD the augmented image; adjusting, by the HMD the augmented image to provide an amended augmented image that corresponds to visual information as viewed by the HMD at a display point in time; wherein the adjusting comprises overlaying at least a part of the augmented image over the visual information viewed by the HMD at the display point of time and matching a target object of the augmented image to the target object as appearing in the visual information viewed by the HMD at the display point of time; wherein the overlaying of the at least part of the augmented image over the visual information viewed by the HMD at the display point of time comprises projecting staggered parts of the augmented image over the visual information viewed by the HMD at the display point of time.

20. The non-transitory computer readable medium according to claim 19 that once executed by the computer causes the computer to execute the steps of relaying the first image and the feedback from the computerized device of the second user to a computerized device of a third user; displaying on the computerized device of the third user the first image and receiving additional feedback from the third user.

* * * * *

UNITED STATES PATENT AND TRADEMARK OFFICE
CERTIFICATE OF CORRECTION

| | | |
|---|---|---|
| PATENT NO. | : 10,339,382 B2 | Page 1 of 1 |
| APPLICATION NO. | : 14/852567 | |
| DATED | : July 2, 2019 | |
| INVENTOR(S) | : Shay Solomin, Evyatar Meiron and Alex Rapoport | |

It is certified that error appears in the above-identified patent and that said Letters Patent is hereby corrected as shown below:

On the Title Page

Item (12) "Solomin et al." should read -- Solomon et al. --.

Item (72) The name of the first inventor is hereby corrected to and replaced with the spelling: "Shay Solomon".

Signed and Sealed this
Twenty-third Day of June, 2020

Andrei Iancu
*Director of the United States Patent and Trademark Office*